US012683720B2

(12) United States Patent
Cha et al.

(10) Patent No.: US 12,683,720 B2
(45) Date of Patent: Jul. 14, 2026

(54) METHOD AND DEVICE FOR PROCESSING RADIO LINK CONTROL FOR PDUS

(71) Applicant: Samsung Electronics Co., Ltd., Suwon-si (KR)

(72) Inventors: Jiyoung Cha, Suwon-si (KR); Byounghoon Jung, Suwon-si (KR); Jungsoo Jung, Suwon-si (KR); Hyunjoong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 18/259,522

(22) PCT Filed: Dec. 29, 2021

(86) PCT No.: PCT/KR2021/020199
§ 371 (c)(1),
(2) Date: Jun. 27, 2023

(87) PCT Pub. No.: WO2022/146039
PCT Pub. Date: Jul. 7, 2022

(65) Prior Publication Data
US 2024/0063952 A1     Feb. 22, 2024

(30) Foreign Application Priority Data
Dec. 29, 2020     (KR) ........................ 10-2020-0186774

(51) Int. Cl.
H04W 4/00     (2018.01)
H04L 1/1825     (2023.01)
H04L 5/00     (2006.01)
(52) U.S. Cl.
CPC .......... H04L 1/1825 (2013.01); H04L 5/0055 (2013.01)

(58) Field of Classification Search
CPC ... H04L 1/1825; H04L 5/0055; H04L 1/1635; H04W 28/065; H04W 80/02; H04W 28/04
See application file for complete search history.

(56) References Cited

U.S. PATENT DOCUMENTS 6,731,623 B2     5/2004  Lee et al.
7,729,665 B2     6/2010  Sung et al.
(Continued)

FOREIGN PATENT DOCUMENTS

CN          101043301 A     9/2007
KR      10-0624618 B1     9/2006
(Continued)

OTHER PUBLICATIONS

International Search Report and Written Opinion of the International Searching Authority dated Apr. 7, 2022, in connection with International Application No. PCT/KR2021/020199, 10 pages.
(Continued)

*Primary Examiner* — Abdelnabi O Musa

(57)     ABSTRACT

According to an embodiment of the disclosure, a method of operating a transmitting device in a wireless communication system includes obtaining a plurality of radio link control (RLC) data protocol data units (PDUs) in an RLC entity; generating an automatic repeat request (ARQ) PDU corresponding to an RLC data PDU set including at least one of the plurality of RLC data PDUs based on a resource allocation in the RLC entity; transmitting, from a medium access control (MAC) layer, a first MAC PDU generated based on the RLC data PDU set and the ARQ PDU to a receiving device through a lower layer; and receiving a status PDU associated with the RLC data PDU set when a
(Continued)

certain condition is satisfied, wherein the ARQ PDU includes information for processing an operation related to the RLC data PDU set.

15 Claims, 30 Drawing Sheets

(56) References Cited

U.S. PATENT DOCUMENTS

| | | | |
|---|---|---|---|
| 8,000,256 B2 | 8/2011 | Cha et al. | |
| 8,468,413 B2 | 6/2013 | Kim et al. | |
| 8,897,252 B2 * | 11/2014 | Wu | H04L 1/1867 370/330 |
| 9,001,781 B2 | 4/2015 | Ahluwalia | |
| 11,259,200 B2 | 2/2022 | Kim et al. | |
| 2005/0259583 A1 | 11/2005 | Froc et al. | |
| 2009/0185477 A1 | 7/2009 | Lee et al. | |
| 2009/0232161 A1 | 9/2009 | Yeo et al. | |
| 2011/0317719 A1 | 12/2011 | Vedantham et al. | |
| 2012/0039224 A1 * | 2/2012 | Terry | H04W 28/0242 370/310 |
| 2014/0341173 A1 * | 11/2014 | Wu | H04L 1/1867 370/329 |
| 2015/0264675 A1 | 9/2015 | Kim et al. | |
| 2016/0219458 A1 * | 7/2016 | Kubota | H04W 28/06 |
| 2018/0302821 A1 * | 10/2018 | Gustafsson | H04L 1/188 |
| 2019/0082040 A1 * | 3/2019 | Aziz | H04L 69/324 |
| 2019/0174575 A1 | 6/2019 | Shah et al. | |
| 2019/0230736 A1 | 7/2019 | Quan et al. | |
| 2021/0045029 A1 | 2/2021 | Ryu | |

FOREIGN PATENT DOCUMENTS

| | | |
|---|---|---|
| KR | 10-0704680 B1 | 4/2007 |
| KR | 10-0896507 B1 | 5/2009 |
| KR | 10-0996069 B1 | 11/2010 |
| KR | 10-1692552 B1 | 1/2017 |
| KR | 10-2018-0111413 A | 10/2018 |
| KR | 10-2018-0119891 A | 11/2018 |
| KR | 10-2019-0105930 A | 9/2019 |

OTHER PUBLICATIONS

Supplementary European Search Report dated Oct. 10, 2023, in connection with European Application No. 21915836.7, 8 pages.
Communication under Rule 71(3) EPC dated May 24, 2024, in connection with European Patent Application No. 21915836.7, 101 pages.
Office Action dated Oct. 21, 2025, in connection with Korean Application No. 10-2020-0186774, 8 pages.
First Office action dated May 29, 206 in connection with Chinese Patent Application No. 202180088542.7, 20 pages.

* cited by examiner

PERFORM RLC OPERATION FOR EACH RLC PDU (N TIMES)

FIG. 2B

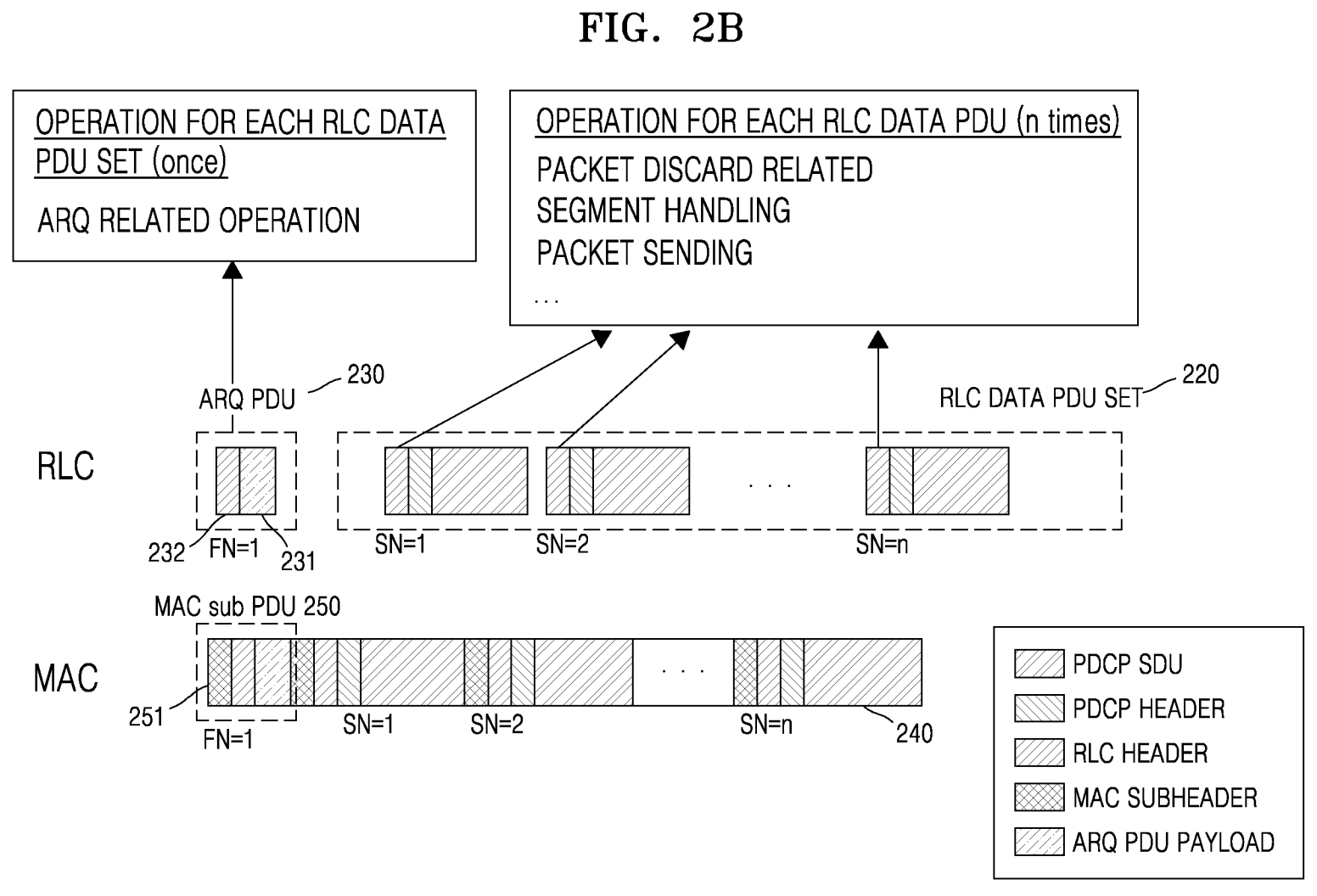

OPERATION FOR EACH RLC DATA PDU (n times)

PACKET DISCARD RELATED
SEGMENT HANDLING
PACKET SENDING
...

OPERATION FOR EACH RLC DATA
PDU SET (once)

ARQ RELATED OPERATION

RLC DATA PDU SET ─ 220

SN=n     SN=2     SN=1

ARQ PDU ─ 230   231
FN=1
232

MAC sub PDU 250
251
FN=1    SN=1    SN=2    SN=n ─ 240

RLC

MAC

PDCP SDU
PDCP HEADER
RLC HEADER
MAC SUBHEADER
ARQ PDU PAYLOAD

MAC PDU 400

PDCP SDU

PDCP HEADER

RLC HEADER

MAC SUBHEADER

ARQ PDU PAYLOAD

710

Option 1
BYTE BASED SEGMENTATION

FN=1

RETRANSMITTED
711 GRANT SIZE

SN=1     SN=2     SN=3     SN=4

MAC PDU

712     FN=1     SN=1          SN=2          SN=3

| | |
|---|---|
| ⊘ PDCP SDU | |
| ⊘ PDCP HEADER | |
| ⊘ RLC HEADER | |
| ⊠ MAC SUBHEADER | |
| ⊘ ARQ PDU PAYLOAD | |

<u>Option 2</u>
RLC SDU BASED SEGMENTATION

FIG. 8B

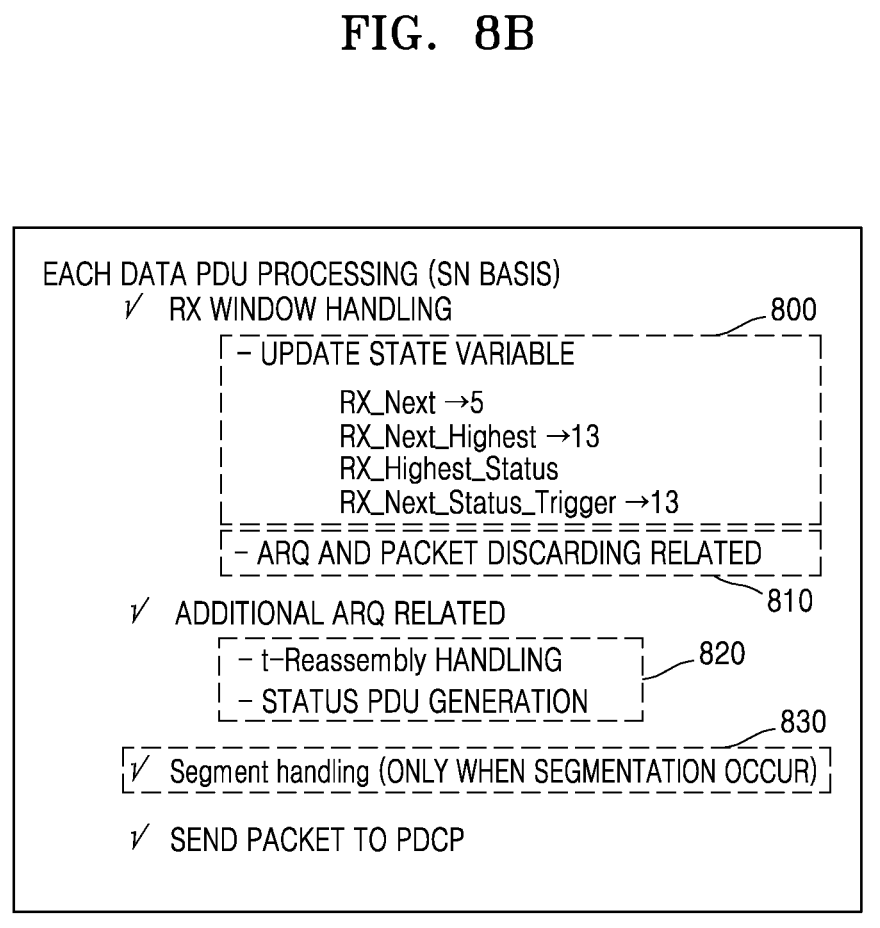

EACH DATA PDU PROCESSING (SN BASIS)
   ✓  RX WINDOW HANDLING                          —800

– UPDATE STATE VARIABLE

RX_Next →5
            RX_Next_Highest →13
            RX_Highest_Status
            RX_Next_Status_Trigger →13

– ARQ AND PACKET DISCARDING RELATED

810

✓  ADDITIONAL ARQ RELATED

– t–Reassembly HANDLING    —820
        – STATUS PDU GENERATION

830

✓  Segment handling (ONLY WHEN SEGMENTATION OCCUR)

✓  SEND PACKET TO PDCP

FIG. 9C

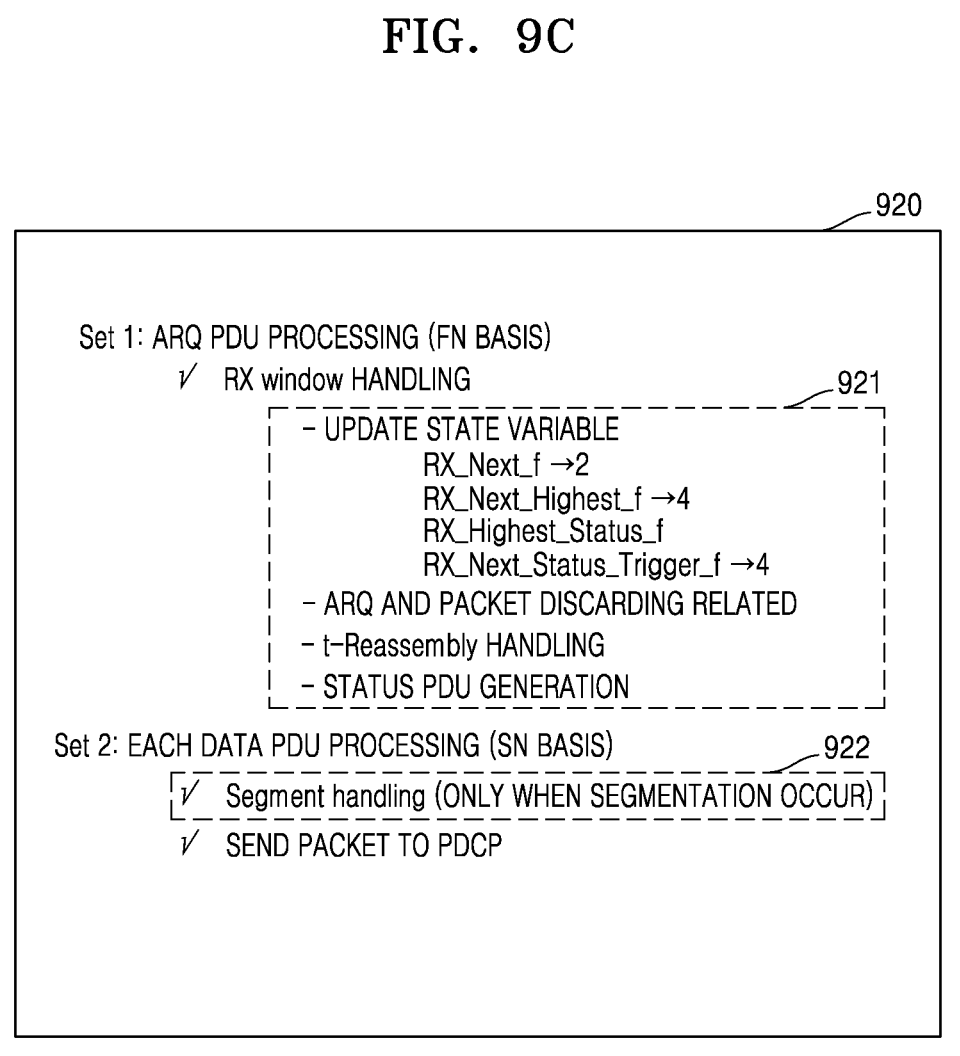

Set 1: ARQ PDU PROCESSING (FN BASIS)

$\checkmark$   RX window HANDLING

– UPDATE STATE VARIABLE

RX_Next_f $\rightarrow$2

RX_Next_Highest_f $\rightarrow$4

RX_Highest_Status_f

RX_Next_Status_Trigger_f $\rightarrow$4

– ARQ AND PACKET DISCARDING RELATED

– t-Reassembly HANDLING

– STATUS PDU GENERATION

Set 2: EACH DATA PDU PROCESSING (SN BASIS)

$\checkmark$   Segment handling (ONLY WHEN SEGMENTATION OCCUR)

$\checkmark$   SEND PACKET TO PDCP

920

921

922

Multi-core RLC Processing

TIME

⇧ PARALLEL FLOW
⇧ CRITICAL SECTION
⇧ BUSY WAIT (UNABLE TO HANDLE PROCESSING BUT WAIT BECAUSE ANOTHER CORE IS USING SHARED RESOURCE)

RLC data PDU

ARQ PDU

RLC DATA PDU

ARQ PDU (FSI=00)

ARQ PDU (FSI=01 or 11 or 10)

RLC data PDU

ARQ PDU STRUCTURE

5G STATUS PDU STRUCTURE

LTE

METHOD AND DEVICE FOR PROCESSING RADIO LINK CONTROL FOR PDUS

TECHNICAL FIELD

The disclosure relates to a method of transmitting and receiving signals in a wireless communication system, and more particularly, to a method and apparatus for handling packets for transmission and reception of signals.

BACKGROUND ART

Looking back on a process of development of radio communication from generation to generation, technologies for human-targeted services such as voice, multimedia, data or the like have usually been developed. Connected devices that are on the explosive rise after commercialization of fifth-generation (5G) communication systems are expected to be connected to communication networks. As examples of things connected to networks, there may be cars, robots, drones, home appliances, displays, smart sensors installed in various infrastructures, construction machinery, factory equipment, etc. Mobile devices are expected to evolve to various form factors such as augmentation reality (AR) glasses, virtual reality (VR) headsets, hologram devices, and the like. In order to provide various services by connecting hundreds of billions of devices and things in the sixth-generation (6G) era, there are ongoing efforts to develop better 6G communication systems. For these reasons, 6G communication systems are referred to as beyond-5G systems.

In the 6G communication system expected to become a reality by around 2030, a maximum transfer rate is tera bits per second (bps), i.e., 1000 giga bps, and a maximum wireless delay is 100 micro seconds (psec). In other words, compared to the 5G communication system, the transfer rate becomes 50 times faster and the wireless delay is reduced to a tenth (1/10) in the 6G communication system.

To attain these high data transfer rates and ultra-low delay, the 6G communication system is considered to be implemented in the terahertz (THz) band (e.g., ranging from 95 gigahertz (GHz) to 3 THz). Due to the more severe path loss and atmospheric absorption phenomenon in the THz band as compared to the millimeter wave (mmWave) band introduced in 5G systems, importance of technology for securing a signal range, i.e., coverage, is expected to grow. As major technologies for securing coverage, radio frequency (RF) elements, antennas, new waveforms superior to orthogonal frequency division multiplexing (OFDM) in terms of coverage, beamforming and massive multiple-input and multiple-output (MIMO), full dimensional MIMO (FFD-MIMO), array antennas, multiple antenna transmission technologies such as large-scale antennas, etc., need to be developed. Besides, new technologies for increasing coverage of THz band signals, such as metamaterial based lenses and antennas, a high-dimensional spatial multiplexing technique using orbital angular momentum (OAM), reconfigurable intelligent surface (RIS), etc., are being discussed.

Furthermore, in order to enhance frequency efficiency and system networks, a full duplex technology by which both uplink and downlink transmissions use the same frequency resource at the same time, a network technology that comprehensively uses satellite and high-altitude platform stations (HAPS) and the like, a network structure innovation technology supporting mobile base stations and allowing optimization and automation of network operation, a dynamic spectrum sharing technology through collision avoidance based on spectrum usage prediction, an artificial intelligence (AI) based communication technology to realize system optimization by using AI from the designing stage and internalizing an end-to-end AI supporting function, a next generation distributed computing technology to realize services having complexity beyond the limit of terminal computing capability by using ultrahigh performance communication and computing resources (e.g., mobile edge computing (MEC) cloud) are being developed in the 6G communication system. In addition, by designing new protocols to be used in 6G communication systems, developing mechanisms for implementing a hardware-based security environment and safe use of data, and developing technologies for protecting privacy, attempts to strengthen connectivity between devices, further optimize the network, promote softwarization of network entities, and increase the openness of wireless communication are continuing.

With such research and development of the 6G communication system, it is expected that new levels of the next hyper-connected experience become possible through hyper-connectivity of the 6G communication system including not only connections between things but also connections between humans and things. Specifically, it is predicted that services such as truly immersive extended reality (truly immersive XR)), high-fidelity mobile hologram, digital replica, etc., may be provided. Furthermore, services such as remote surgery, industrial automation and emergency response with enhanced security and reliability may be provided through the 6G communication system to be applied in various areas such as industry, medical care, vehicles, appliances, etc.

With the development of the aforementioned technologies and wireless communication systems, it is possible to provide various services, and there is a need for a method to provide the services smoothly. Especially, to satisfy an ultra-high transfer rate in a 6G communication system, a communication method of increasing packet processing speed is required.

DISCLOSURE

Technical Problem

Embodiments of the disclosure provide a method and apparatus for processing packets in a wireless communication system.

Technical Solution

According to an embodiment of the disclosure, a method of operating a transmitting device in a wireless communication system includes obtaining a plurality of radio link control (RLC) data protocol data units (PDUs) in an RLC entity; generating an automatic repeat request (ARQ) PDU corresponding to an RLC data PDU set including at least one of the plurality of RLC data PDUs based on a resource allocation in the RLC entity; transmitting, from a medium access control (MAC) layer, a first MAC PDU generated based on the RLC data PDU set and the ARQ PDU to a receiving device through a lower layer; and receiving a status PDU associated with the RLC data PDU set when a certain condition is satisfied, wherein the ARQ PDU includes information for processing an operation related to the RLC data PDU set.

The method may further include generating a second MAC PDU including at least a portion of the RLC data PDU set based on a resource allocation for retransmission when the status PDU includes negative acknowledgment (NACK); and transmitting the second MAC PDU to the receiving device through a lower layer.

The at least a portion of the RLC data PDU set included in the second MAC PDU may be a segment obtained by segmenting the RLC data PDU set, and the method may further include updating the ARQ PDU based on the segmented RLC data set, wherein the second MAC PDU may include the segmented RLC data PDU set and the updated ARQ PDU.

The segmenting may be performed on a byte basis or an RLC service data unit (SDU) basis, and the updated ARQ PDU may include information about the segmented RLC data PDU set.

The information about the segmented RLC data PDU set may include at least one of information about whether segmentation is made, information about a unit of segmentation, information about a location of segmentation, a starting point of segmentation, an ending point of segmentation, or information about an offset from the starting point of segmentation.

According to an embodiment of the disclosure, a method of operating a receiving device in a wireless communication system includes receiving an automatic repeat request (ARQ) protocol data unit (PDU) and a first medium access control (MAC) PDU including a plurality of radio link control (RLC) data PDUs corresponding to the ARQ PDU in an MAC layer; updating a state variable for an RLC data PDU set corresponding to the plurality of RLC data PDUs based on the ARQ PDU in an RLC entity; and transmitting, to a transmitting device, a status PDU generated based on receiving condition information indicating a receiving condition for at least one RLC data PDU set in a receiving window and the updated state variable, when a certain condition is satisfied, wherein the ARQ PDU may include information for processing an operation related to the RLC data PDU set.

The method may further include determining whether the plurality of RLC data PDUs are included in a receiving window based on information included in the ARQ PDU; and discarding, based on a result of the determining, an RLC data PDU not included in the receiving window among the plurality of RLC data PDUs, wherein the information included in the ARQ PDU may include a sequence number of each of the plurality of RLC data PDUs or an identification number of the RLC data PDU set.

The method may further include determining, based on the information included in the ARQ PDU, whether the plurality of RLC data PDUs are redundantly received; and discarding an RLC data PDU determined as having been redundantly received among the plurality of RLC data PDUs, wherein the information included in the ARQ PDU may include a sequence number of each of the plurality of RLC data PDUs or an identification number of the RLC data PDU set.

The status PDU may include NACK when it is determined that the RLC data PDU set is not received, and the method may further include: receiving, from the transmitting device, a second MAC PDU generated based on the status PDU.

The second MAC PDU may be generated based on at least a portion of the RLC data PDU set being segmented when a resource allocation for retransmission is smaller than a transmission resource required for the RLC data PDU set.

The ARQ PDU included in the second MAC PDU may include information about the segmentation, and the information about the segmentation may include at least one of information about whether segmentation is made, information about a unit of segmentation, information about a location of segmentation, a starting point of segmentation, an ending point of segmentation, or information about an offset from the starting point of segmentation.

According to an embodiment of the disclosure, a transmitting device in a wireless communication system includes a transceiver; and at least one processor connected to the communicator, wherein the at least one processor is configured to obtain a plurality of radio link control (RLC) data protocol data units (PDUs) in an RLC entity, generate an automatic repeat request (ARQ) PDU corresponding to an RLC data PDU set including at least one of the plurality of RLC data PDUs based on a resource allocation in the RLC entity, transmit a first medium access control (MAC) PDU generated based on the RLC data PDU set and the ARQ PDU in a MAC layer to a receiving device through a lower layer, receive a status PDU associated with the RLC data PDU set when a certain condition is satisfied, wherein the ARQ PDU includes information for processing an operation related to the RLC data PDU set.

According to an embodiment of the disclosure, a receiving device in a wireless communication system includes a transceiver; and at least one processor connected to the communicator, wherein the at least one processor is configured to receive an automatic repeat request (ARQ) protocol data unit (PDU) and a first medium access control (MAC) PDU including a plurality of radio link control (RLC) data PDUs corresponding to the ARQ PDU in an MAC layer, update a state variable for an RLC data PDU set corresponding to the plurality of RLC data PDUs based on the ARQ PDU in an RLC entity, transmit, to a transmitting device, a status PDU generated based on receiving condition information indicating a receiving condition for at least one RLC data PDU set in a receiving window and the updated state variable, when a certain condition is satisfied, wherein the ARQ PDU includes information for processing an operation related to the RLC data PDU set.

DESCRIPTION OF DRAWINGS

FIG. 2B is a diagram for describing an ARQ protocol data unit (PDU) for processing an ARQ related operation, according to an embodiment of the disclosure.

FIG. 8B is a diagram for describing the existing sequence number based RLC operation, according to an embodiment of the disclosure.

FIG. 9C is a diagram for describing ARQ PDU based RLC operations, according to another embodiment of the disclosure.

MODE FOR INVENTION

Figure 1:
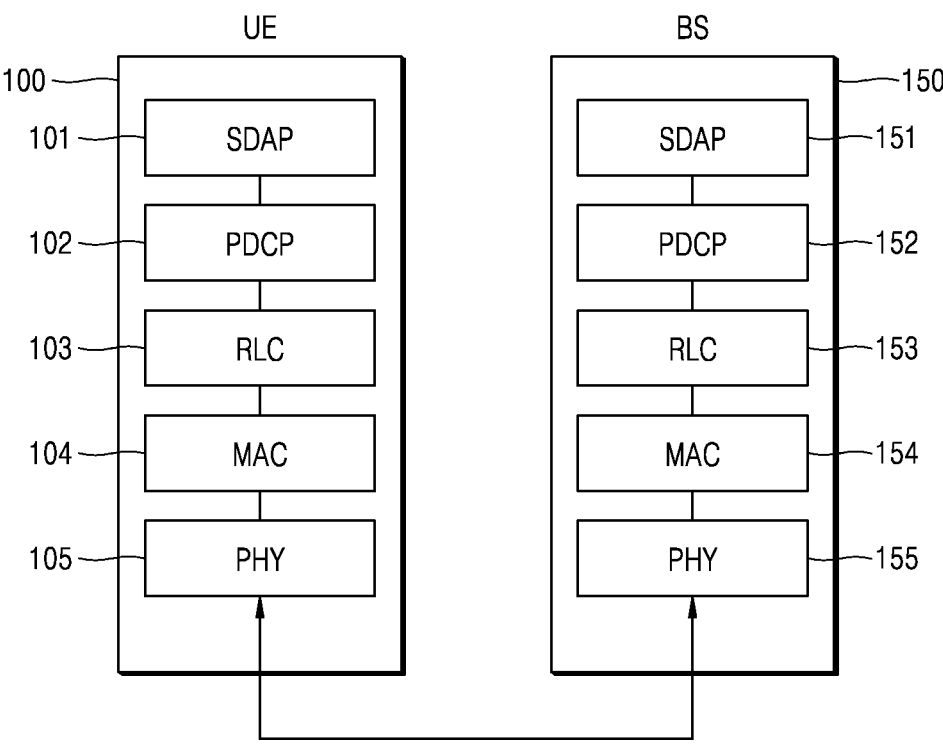
FIG. 1 illustrates a protocol architecture of a wireless communication system, according to an embodiment of the disclosure.

Embodiments of the disclosure will be described in detail with reference to accompanying drawings.

Technological content well-known in the art or not directly related to the disclosure is omitted in the following description. Through the omission of the content that might otherwise obscure the subject matter of the disclosure, the subject matter will be understood more clearly.

For the same reason, some parts in the accompanying drawings are exaggerated, omitted or schematically illustrated. The size of the respective elements may not fully reflect their actual size. Like numbers refer to like elements throughout the drawings.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification. In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

Although the following embodiments will focus on long term evolution (LTE), LTE-Advanced (LTE-A), and new radio (NR) systems, they may be applied to other communication systems with similar technical backgrounds or channel types. For example, the NR system may be the 5th generation (5G) mobile communication technology, i.e., 5G NR, developed since the LTE-A, and the term '5G' as herein used may be a concept including the existing LTE, LTE-A, or other similar services. Furthermore, those of ordinary skill in the art will appreciate that embodiments of the disclosure will also be applied to different communication systems, e.g., Wi-MAX and Wi-Bro, with some modifications to such an extent that does not significantly deviate from the scope of the disclosure.

It will be understood that each block and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments, the module may include one or more processors.

FIG. 1 illustrates a protocol architecture of a wireless communication system, according to an embodiment of the disclosure.

Referring to FIG. 1, a radio protocol of a wireless communication system may include a service data adaptation protocol (SDAP) layer 101 or 151, a packet data convergent protocol (PDCP) layer 102 or 152, a radio link control (RLC) layer 103 or 153, and a medium access control (MAC) layer 104 or 154 in each of a user equipment (UE) 100 and a base station (BS) 150.

In some embodiments, main functions of the SDAP layer 101 or 151 may include some of the following functions: It is, of course, not limited thereto.
   user plane data transfer function
   function of mapping between a quality of service (QoS) flow and a data bearer (DRB) for both downlink (DL) and uplink (UL)
   function of marking QoS flow identification (ID) for both UL and DL
   function of mapping of a reflective QoS flow to a data bearer (DRB) for UL SDAP PDUs For the SDAP layer 101 or 151, the UE may receive a configuration of whether to use a header of the SDAP layer 101 or 151 or whether to use a function of the SADP layer 101 or 151 for each PDCP layer 102 or 152 or each bearer or each logical channel in a radio resource control (RRC) message. Furthermore, when the SDAP header is configured, the SDAP layer 101 or 151 may instruct the UE to update or reconfigure mapping information of the QoS flow and the data bearer for UL or DL with a 1-bit non-access stratum (NAS) reflective QoS indicator (NAS reflective QoS) and a 1-bit access stratum (AS) reflective QoS indicator (AS reflective QoS) of the SDAP header. In some embodiments, the SDAP header may include QoS flow ID information indicating QoS. In some embodiments, QoS information may be used for data process priority, scheduling, etc., for supporting smoother services.

In some embodiments, main functions of the PDCP layer 102 or 152 may include some of the following functions: It is, of course, not limited thereto.

header compression and decompression function (e.g., header compression and decompression: robust header compression (ROHC) only)
   user data transfer function
   sequential delivery function (e.g., in-sequence delivery of upper layer PDUs)
   non-sequential delivery function (e.g., out-of-sequence delivery of upper layer PDUs)
   reordering function (e.g., PDCP PDU reordering for reception)
   duplicate detection function (e.g., duplicate detection of lower layer SDUs)
   retransmission function (e.g., retransmission of PDCP SDUs)
   ciphering and deciphering function
   timer based service data unit (SDU) discarding function (e.g., timer-based SDU discarding in uplink)

In some embodiments, the reordering function of the NR PDCP layer 102 or 152 may include at least one of a function of reordering PDCP PDUs received from a lower layer based on PDCP sequence numbers (SNs), a function of transferring data to a higher layer in the reordered sequence or transferring the data directly to the higher layer without considering the sequence, a function of reordering the sequence to record missing PDCP PDUs, a function of reporting status of missing PDCP PDUs to a transmitting end, and a function of requesting retransmission of missing PDCP PDUs.

In some embodiments, main functions of the RLC layer 103 or 153 may include some of the following functions: It is, of course, not limited thereto.
   data transfer function (e.g., transfer of upper layer PDUs)
   sequential delivery function (e.g., in-sequence delivery of upper layer PDUs)
   non-sequential delivery function (e.g., out-of-sequence delivery of upper layer PDUs)
   automatic repeat request (ARQ) function (e.g., error correction through ARQ)
   concatenation, segmentation, and reassembling function (e.g., concatenation, segmentation and reassembly of RLC SDUs)
   re-segmentation function (e.g., re-segmentation of RLC data PDUs)
   reordering function (e.g., reordering of RLC data PDUs)
   duplicate detection function
   error detection function (e.g., protocol error detection)
   RLC SDU discard function
   RLC re-establishment function In some embodiments, the sequential delivery function (in-sequence delivery) of the RLC layer 103 or 153 may include a function of delivering RLC SDUs received from a lower layer to a higher layer in order, a function of receiving, reassembling and delivering multiple RLC SDUs resulting from segmentation of one original RLC SDU, a function of reordering the received RLC PDUs based on RLC SNs or PDCP SNs, a function of reordering the sequence to record missing RLC PDUs, a function of reporting status of missing RLC PDUs to a transmitting end, a function of requesting retransmission of missing PDCP PDUs, a function, when there is a missing RLC SDU, of delivering RLC SDUs before the missing RLC SDU to a higher layer in sequence, a function, when there is a missing RLC SDU but a timer is expired, of delivering all RLC SDUs received before the timer starts to a higher layer in sequence, or a function, when there is a missing RLC SDU but a timer is expired, of delivering all RLC SDUs received up to present to a higher layer in sequence. Furthermore, the RLC layer 103 or 153 may deliver RLC PDUs to a PDCP layer regardless of the sequence (out-of-sequence delivery) by processing the RLC PDUs in the order of reception (or in the order of arrival without regard to the order of the SNs), or when the RLC PDU is segmented, receive and reassemble the segmentations stored in a buffer or to be received later into one complete RLC PDU, and then process and deliver the RLC PDU to the PDCP layer 102 or 152. In some embodiments, the RLC layer 103 or 153 may not include the concatenation function, but may perform the function in the MAC layer 104 or 154 or replace the function with a multiplexing function of the MAC layer 104 or 154.

The non-sequential delivery (out-of-sequence delivery) function of the RLC layer 103 or 153 may include at least one of a function of delivering RLC SDUs received from a lower layer directly to a higher layer without regard to the sequence, a function of receiving, reassembling and delivering multiple RLC SDUs resulting from segmentation of an original RLC SDU, and a function of storing RLC SNs or PDCP SNs of the received RLC PDUs and reordering the sequence to record missing RLC PDUs.

In some embodiments, the MAC layer 104 or 154 may be connected to multiple RLC layers configured in a UE 100, and main functions of the MAC layer may include some of the following functions: It is, of course, not limited to the following example.

mapping function (e.g., mapping between logical channels and transport channels)

multiplexing and demultiplexing function (e.g., multiplexing/demultiplexing of MAC SDUs)

scheduling information report function

HARQ function (e.g., error correction through HARQ)

logical channel priority control function (e.g., priority handling between logical channels of one UE)

UE priority control function (e.g., priority handling between UEs by means of dynamic scheduling)

MBMS service identification function transport format selection function padding function In some embodiments, a physical (PHY) layer 105 or 155 may perform channel coding and modulation on higher layer data, form the data into OFDM symbols and transmit them on a radio channel, or may demodulate OFDM symbols received on a radio channel, perform channel decoding on them and send the result to a higher layer. It is, of course, not limited thereto.

By efficiently processing operations having a heavy processing load among the aforementioned radio protocol operations, the UE 100 or a BS 150 may provide a higher data rate. Specifically, among the operations of the RLC layer 103 or 153, an ARQ related operation, an operation of generating a status PDU, and a segmentation related operation correspond to one of the most heavy-loaded operations. In terms of space and costs, a packet processing load of the UE 100 having a limited processing capability may have more severe problems. A method of efficiently processing the operations will be described later.

Referring to FIG. 1, the UE 100 and the BS 150 may perform transmission or reception between their radio protocols. In this case, the UE 100 or the BS 150 may be a transmitting device or a receiving device, to which the following operations may be applied regardless of which one of the UE 100 or the BS 150 is the transmitting device or the receiving device. A transmitting device or a receiving device as herein used may refer to the UE 100 or the BS 150.

Figure 2A:
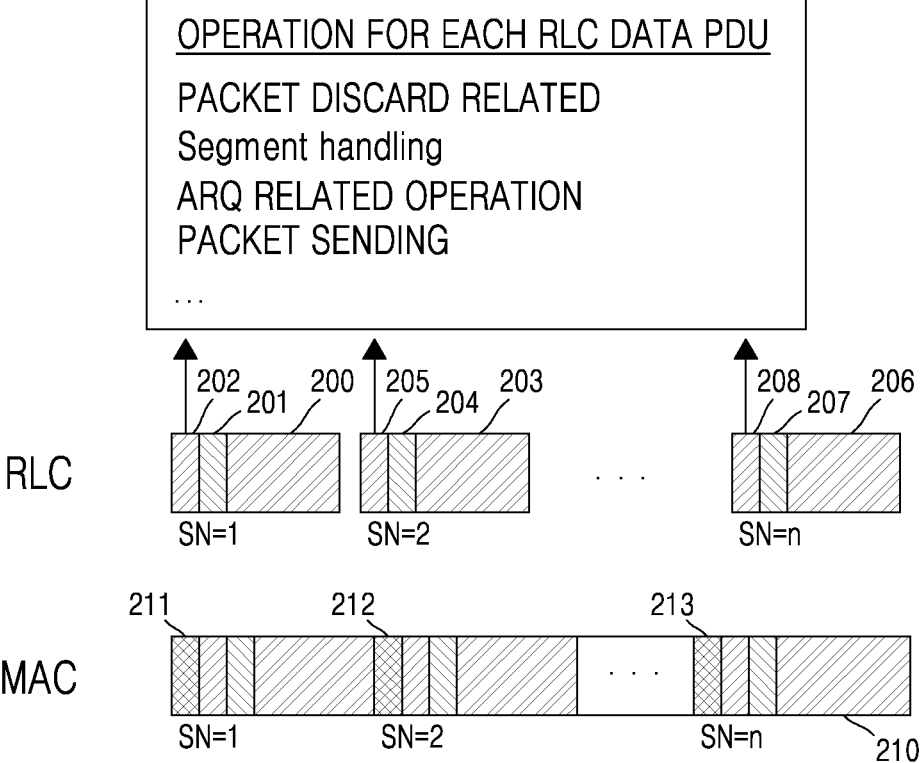
FIG. 2A is a diagram for describing a method of processing an automatic repeat request (ARQ) related operation, according to an embodiment of the disclosure.

FIG. 2A is a diagram for describing a method of processing an ARQ related operation, according to an embodiment of the disclosure.

The RLC layer in the transmitting device may process an RLC SDU sent from the PDCP layer. In this case, the RLC SDU may correspond to a PDCP PDU in which a PDCP header 201, 204 or 207 is concatenated with a PDCP SDU 200, 203 or 206. The PDCP SDU 200, 203 or 206 may correspond to a service data adaptation protocol (SDAP) PDU (not shown), but hereinafter, operations in the RLC and lower layers will be described based on the PDCP SDU 200, 203 or 206.

The PDCP PDU received in the RLC layer may correspond to an RLC SDU. Referring to FIG. 2A, the RLC layer may allocate a sequence number (SN) from 1 to n for each RLC SDU received. The RLC PDU may include an RLC data PDU (a transparent mode data (TMD) PDU, an unacknowledged mode data (UMD), or an acknowledged Mode Data (AMD)) and an RLC control PDU (a status PDU or an ARQ PDU), and the RLC control PDU is not allocated any sequence number.

Hereinafter, for convenience of explanation, processing of a packet corresponding to sequence number 1 will be described, but it is obvious that the processing will be equally applied to packets corresponding to sequence numbers 1 to n. An RLC SDU corresponding to sequence number n will now be referred to as the n-th RLC SDU and an RLC data PDU that includes the n-th RLC SDU will be referred to as the n-th RLC data PDU.

The RLC layer may generate the first RLC data PDU to n-th RLC data PDU by concatenating the received first RLC SDU to n-th RLC SDU with RLC headers. Specifically, the RLC layer may generate the first RLC PDU by concatenating the first RLC SDU 200 and 201 with an RLC header 202. The RLC headers 202, 205 and 208 included in the first RLC data PDU, the second RLC data PDU and the n-th RLC data PDU, respectively, may each include information for processing an operation of the RLC data PDU. Specifically, the RLC headers 202, 205 and 208 may each include information for processing an operation such as packet discarding, segmentation handling, an ARQ related operation, packet delivery, etc., for the first RLC data PDU, the second RLC data PDU and the n-th RLC data PDU, respectively.

The RLC layer may send the generated RLC data PDUs to the MAC layer, which may in turn generate MAC PDUs having the received RLC data PDUs concatenated with respective MAC subheaders 211, 212 and 213. In this case, one MAC PDU 210 including all the first to n-th RLC data PDUs may be generated. In the meantime, when the MAC PDU may not include all the first to n-th RLC data PDUs according to a resource allocation, the number of RLC data PDUs included in the MAC PDU may be changed (not shown). For example, according to a resource allocation, the first to m-th RLC data PDUs may be included in one transmission block (m<n). Specifically, the number of RLC data PDUs included in the MAC PDU 210 may vary depending on the resource allocation, and according to a resource allocation, only the first to m-th RLC data PDUs may be included in one transmission block among the first to n-th RLC data PDUs.

According to the aforementioned method, RLC operations need to be performed n times because the RLC operation needs to be performed for each of the RLC data PDUs. As described above in connection with FIG. 1, of the operations of the RLC layer, the ARQ related operation may have a high proportion in layer 2 (L2). For example, the ARQ related operation may require two times more load than that in the MAC layer or PDCP layer of L2, and especially, the ARQ related operation, the operation of generating the status PDU and segmentation related operations are one of the heaviest functions, which may cause a bottleneck phenomenon in the RLC layer. Hence, a scheme for efficiently performing the ARQ related operation is required.

FIG. 2B is a diagram for describing an ARQ PDU for processing an ARQ related operation, according to an embodiment of the disclosure.

In an embodiment of the disclosure, the RLC layer may generate an ARQ PDU 230 corresponding to an RLC data PDU set 220 including first to n-th RLC data PDUs. In this case, the RLC layer may process an ARQ related operation for the RLC data PDU set 220 based on the ARQ PDU 230. Specifically, the RLC layer may add information about an operation related to the first to n-th RLC data PDUs to the ARQ PDU 230, to reduce the number of performing certain RLC layer operations (e.g., ARQ related operations) from n to one. In this case, first to n-th RLC headers included in the first to n-th RLC data PDUs, respectively, may include information about all RLC operations except information about the certain RLC layer operation included in the ARQ PDU. Specifically, the RLC layer of a receiving device may perform a certain RLC layer operation once for the RLC data PDU set 220 based on the ARQ PDU 230, and perform the remaining RLC operations for the respective first to n-th RLC data PDUs n times. In the meantime, in the embodiment as described above with reference to FIG. 2A where the first to m-th RLC data PDUs are included in a transmission block, it is obvious that the number of performing certain RLC layer operations for the respective first to m-th RLC data PDUs may be reduced from m to one.

Although it has been described that the MAC layer receives a plurality of RLC data PDUs from one RLC entity for convenience of explanation, RLC data PDUs may be received from a plurality of RLC entities, respectively (not shown). Herein, an entity to perform operations of the RLC layer is defined to be an RLC entity. Specifically, a plurality of RLC entities to perform operations related with the RLC layer may be included in one device, and RLC data PDUs received from multiple RLC entities may be included in an MAC PDU. What includes an RLC data PDU set and an ARQ PDU corresponding to the RLC data PDU set is defined as an RLC frame.

In this case, an MAC PDU may be generated based on a plurality of ARQ PDUs included in a plurality of RLC frames and the plurality of RLC data PDUs, each of which are concatenated with an MAC subheader. Specifically, the MAC PDU may include multiple RLC frames (ARQ PDUs and corresponding RLC data PDUs) obtained from multiple RLC entities. In this case, each RLC entity may separately operate a frame number (FN) corresponding to an RLC frame like it separately operates the sequence number (SN) corresponding to the RLC data PDU. Specifically, one MAC PDU may include both an RLC frame corresponding to frame number 3 from the first RLC entity and an RLC frame corresponding to frame number 97 from the second RLC entity. In this case, a subsequent MAC PDU to be transmitted may include an RLC frame corresponding to frame number 4 from the first RLC entity and an RLC frame corresponding to frame number 98 from the second RLC entity. Specifically, the receiving device may determine which RLC entity has transmitted the ARQ PDU or RLC data PDUs based on information (e.g., a logical channel identifier) included in each MAC subheader, and may process the RLC frames in the corresponding RLC entity based on the ARQ PDU.

Hereinafter, RLC frames obtained from a single RLC entity will be described for convenience of explanation, but the description will also be equally applied to RLC frames received from the plurality of RLC entities as described above.

Referring to FIG. 2B, the RLC data PDU set 220 including the first to n-th RLC data PDUs may correspond to frame number 1, and the ARQ PDU 230 may correspond to the frame number 1. A second RLC data set (not shown) including (n+1)-th RLC data PDU to n'-th RLC data PDU may correspond to frame number 2, and an ARQ PDU (not shown) corresponding to the frame number 2 may be generated. Specifically, what includes the first RLC data PDU set and the first ARQ PDU may be referred to as the first RLC frame, what includes the second RLC data PDU set and the second ARQ PDU may be referred to as the second RLC frame, and what includes the n-th RLC data PDU set and the n-th ARQ PDU may be referred to as the n-th RLC frame. That is, the n-th RLC frame corresponds to including the n-th RLC data PDU set and the n-th ARQ PDU. In this case, the ARQ PDU may include information about the frame number to indicate which RLC frame is associated with the operation.

The ARQ PDU 230 may be newly generated in the RLC layer rather than being received from the higher layer. Accordingly, unlike the RLC data PDUs, the ARQ PDU 230 does not include the PDCP header or the PDCP SDU. The ARQ PDU 230 may include an ARQ PDU payload 231 and an RLC header 232. The ARQ PDU payload 231 or the RLC header 232 may include information for processing an operation related to the RLC data PDU set 220. In other words, the RLC layer may perform an operation related to a certain RLC layer for the first RLC data PDU to the n-th RLC data PDU once based on the ARQ PDU 230, and perform only the remaining RLC operations n times. Accordingly, the existing bottleneck phenomenon may be relieved in the RLC layer as the process of the operation related to the RLC layer having a heavy packet processing load is reduced to 1/n.

The MAC layer may generate MAC subheaders for the respective RLC data PDUs included in the RLC data PDU set 220 and the ARQ PDU 230. Specifically, the MAC layer may generate an MAC sub PDU 250 having the ARQ PDU 230 concatenated with an MAC subheader 251. The MAC layer may also generate MAC sub PDUs each having an RLC data PDU concatenated with an MAC subheader. Furthermore, the MAC layer may generate an MAC PDU 240 including the RLC data PDU set 220, the ARQ PDU 230, and the MAC subheaders. The MAC PDU 240 may be transmitted to the receiving device through the lower layer.

Figure 3:
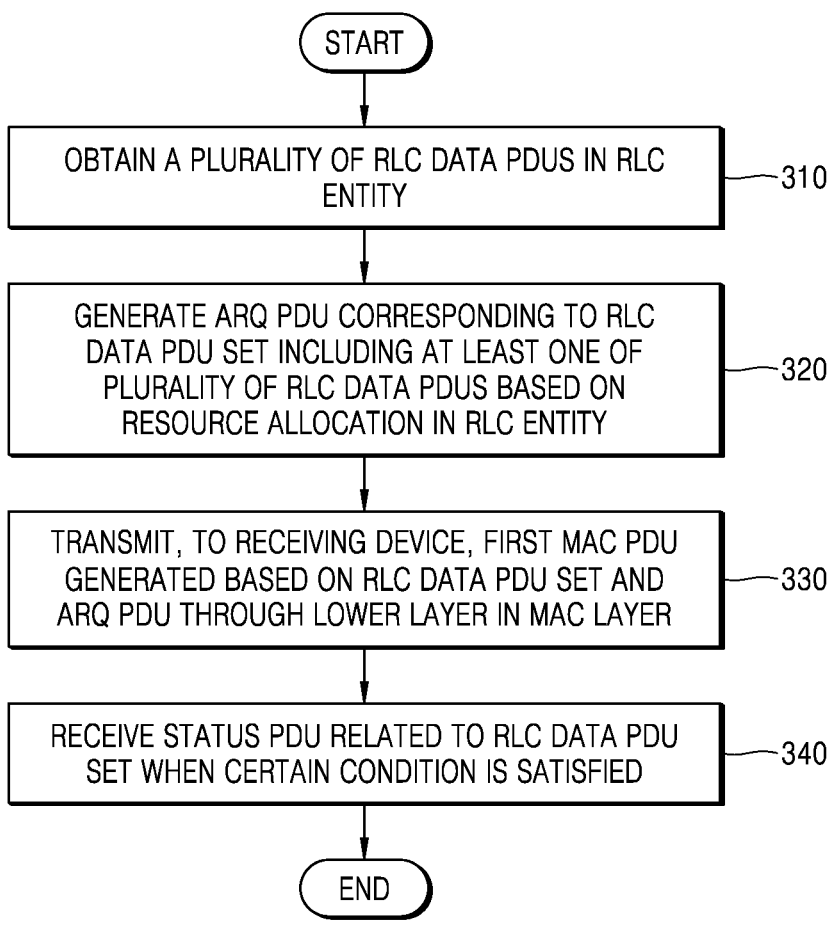
FIG. 3 is a flowchart for describing operations of a transmitting device, according to an embodiment of the disclosure.

FIG. 3 is a flowchart for describing operations of a transmitting device, according to an embodiment of the disclosure.

In operation 310, the transmitting device may obtain the plurality of RLC data PDUs in the RLC entity. Specifically, the transmitting device may obtain a plurality of PDCP PDUs from the PDCP layer, and the plurality of PDCP PDUs may correspond to RLC SDUs. The transmitting device may also obtain the plurality of RLC SDUs from the higher layer and generate the RLC PDUs having the obtained RLC SDUs concatenated with RLC headers. The RLC PDUs obtained in the RLC layer may include RLC data PDUs. Specifically, the RLC PDU may include an RLC data PDU (a TMD PDU, a UMD, or an AMD) and an RLC control PDU (a status PDU or an ARQ PDU), and the RLC control PDU may be generated in the RLC layer.

In operation 320, the transmitting device may generate an ARQ PDU corresponding to an RLC data PDU set including at least one of the plurality of RLC data PDUs based on a resource allocation, in the RLC entity. The ARQ PDU may include information for processing an operation related to the RLC data PDU set. For example, the ARQ PDU may include at least one piece of information for processing an operation related to an automatic retransmission request for at least one RLC data PDU, an operation of determining whether it is in a receiving window, an operation of determining whether it is a duplicate packet, or an operation for packet discarding.

The transmitting device may generate an ARQ PDU corresponding to an RLC data PDU set. For example, the transmitting device may generate a first ARQ PDU corresponding to a first RLC data PDU set, and a second ARQ PDU corresponding to a second RLC data PDU set. In this case, the first ARQ PDU may include information for processing an operation related to the first RLC PDU set.

The number of RLC data PDUs included in the RLC data PDU set may be determined by a resource allocation. Specifically, the RLC entity may obtain resource allocation information from the MAC layer. The resource may be allocated on a byte basis, and the transmitting device may determine the RLC data PDU set based on the resource allocation information. For example, the transmitting device may determine to transmit the first RLC data PDU to the n-th RLC data PDU based on the resource allocation information. In other words, it may be determined that the first RLC data PDU to the n-th RLC data PDU are included in one RLC data PDU set. In this case, the transmitting device may generate an ARQ PDU corresponding to the determined RLC data PDU set, and the ARQ PDU may include information about the first RLC data PDU to the n-th RLC data PDU included in the determined RLC data set.

When the resource allocation is not enough to transmit the first RLC data PDU to the n-th RLC data PDU and the corresponding ARQ PDU, segmentation may occur in a certain RLC SDU. In this case, the RLC data PDU set may include the segmented RLC SDU according to a resource allocation. For example, according to a resource allocation, the first RLC SDU to the (n−1)-th RLC SDU, at least a portion of the n-th RLC SDU, and RLC headers (corresponding to the first RLC SDU to the (n−1)-th RLC SDU, and the at least a portion of the n-th RLC SDU, respectively) may be included in one RLC data PDU set. In this case, the transmitting device may generate an ARQ PDU corresponding to the RLC data PDU set including the segmented n-th RLC SDU. Information about the segmented n-th RLC SDU (e.g., segmentation information) may be included in the RLC header corresponding to the segmented n-th RLC SDU.

In operation 330, the transmitting device may transmit a first MAC PDU generated in the MAC layer based on the RLC data PDU set and the ARQ PDU to a receiving device through a lower layer. In this case, the first MAC PDU may include one RLC data PDU set and one ARQ PDU. In addition, the first MAC PDU may include a plurality of RLC data PDU sets and a plurality of ARQ PDUs. For example, the first ARQ PDU to the n-th ARQ PDU corresponding to the first RLC data PDU set to the n-th RLC data PDU set, respectively, may be included in one MAC PDU.

In operation 340, the transmitting device may receive, from a receiving device, a status PDU associated with the RLC data PDU set when a certain condition is met. Specifically, the status PDU may include acknowledgment (ACK) or negative acknowledgment (NACK) indicating whether the RLC data PDU set is received.

The transmitting device may generate a second MAC PDU including at least a portion of the RLC data PDU set based on a resource allocation for retransmission when the status PDU includes NACK, and transmit the second MAC PDU to the receiving device through a lower layer. When the status PDU includes NACK and the resource allocation for retransmission is enough to include the transmitted RLC data PDU set, the second MAC PDU may include the entire RLC data PDU set. On the other hand, when the resource allocation for retransmission is not enough to include the transmitted RLC data PDU set, the second MAC PDU may include at least a portion of the transmitted RLC data PDU set. The at least a portion of the RLC data PDU set is a segmentation of the RLC data PDU set, and the ARQ PDU may be updated based on the segmented RLC data PDU set. In this case, the second MAC PDU may include the segmented RLC data PDU set and the updated ARQ PDU.

The receiving device may determine whether a certain RLC frame has been received based on a state variable, and trigger status reporting when a certain condition is met based on a result of the determining.

Figure 4:
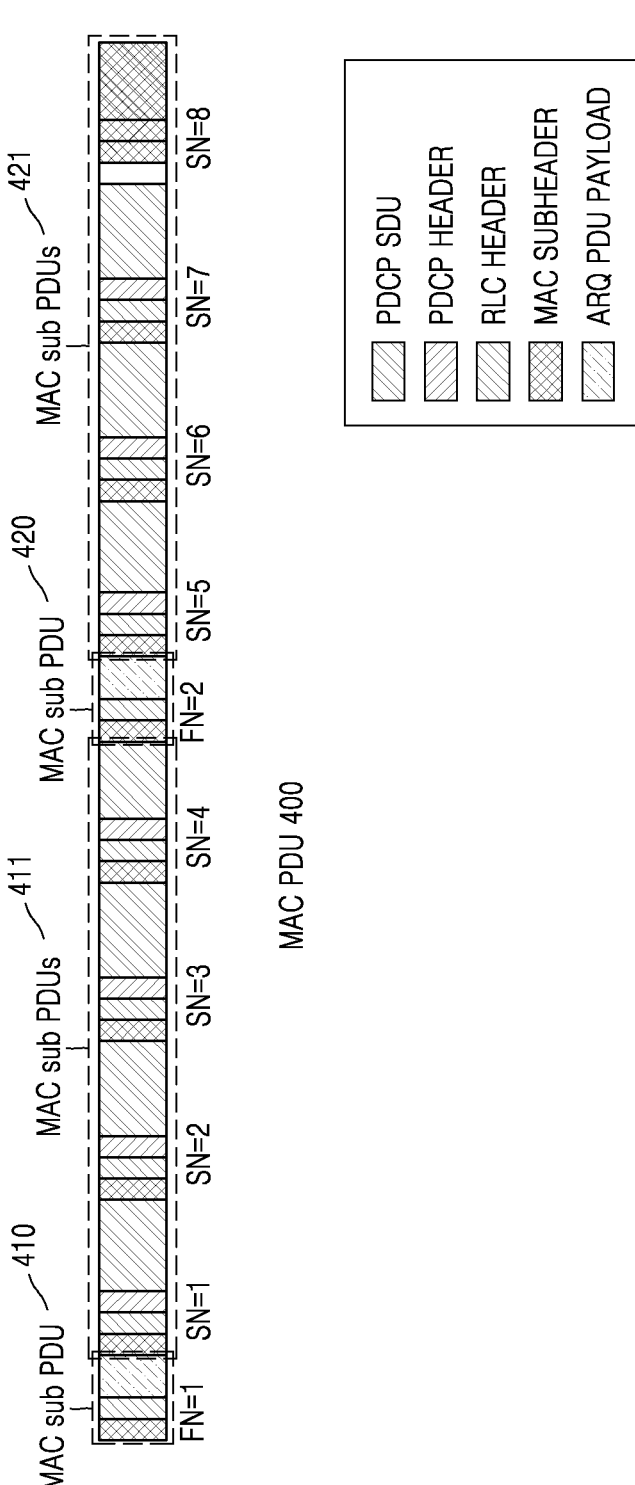
FIG. 4 is a diagram for describing a medium access control (MAC) PDU, according to an embodiment of the disclosure.

FIG. 4 is a diagram for describing an MAC PDU, according to an embodiment of the disclosure.

An MAC PDU 400 may be generated based on not only one RLC frame but also a plurality of RLC frames. Referring to FIG. 4, the MAC PDU 400 may include am MAC sub PDU 410 or 420, and a plurality of MAC sub PDUs 411 or 421. The MAC sub PDU 410 is one having the first ARQ PDU concatenated with an MAC subheader, and the MAC sub PDU 420 refers to one having the second ARQ PDU concatenated with an MAC sub header. The MAC sub PDUs 411 are those having RLC data PDUs corresponding to the first ARQ PDU, each of which is concatenated with an MAC subheader, and the MAC sub PDUs 421 refer to those having RLC data PDUs corresponding to the second ARQ PDU, each of which is concatenated with an MAC subheader. In this case, the MAC PDU 400 may be generated based on a plurality of RLC frames received from a single RLC entity or multiple RLC entities.

In an embodiment of the disclosure, the MAC PDU 400 may be generated based on a plurality of RLC frames received from a single RLC entity. For example, the single RLC entity may determine the first RLC frame and the second RLC frame based on resource allocation information, and the MAC PDU 400 may include MAC sub PDUs 420 and 421 corresponding to the second RLC frame as well as MAC sub PDUs 410 and 411 corresponding to the first RLC frame.

On the other hand, in an embodiment of the disclosure, the MAC PDU 400 may include a plurality of RLC frames received from a plurality of RLC entities. For example, the MAC sub PDUs 410 and 411 may be generated based on the first RLC frame received from the first RLC entity, and the MAC sub PDUs 420 and 421 may be generated based on the second RLC frame received from the second RLC entity.

Specifically, the plurality of RLC frames received from the plurality of RLC entities may include one MAC PDU, and the RLC entities may independently operate frame numbers as they operate sequence numbers independently. For example, one MAC PDU may include RLC frame 3 (not shown) received from the first RLC entity, RLC frame 97 (not shown) received from the second RLC entity and MAC subheaders, and a subsequent MAC PDU for transmission may include RLC frame 4 (not shown) received from the first RLC entity, RLC frame 98 (not shown) received from the second RLC entity, and MAC subheaders.

Figure 5:
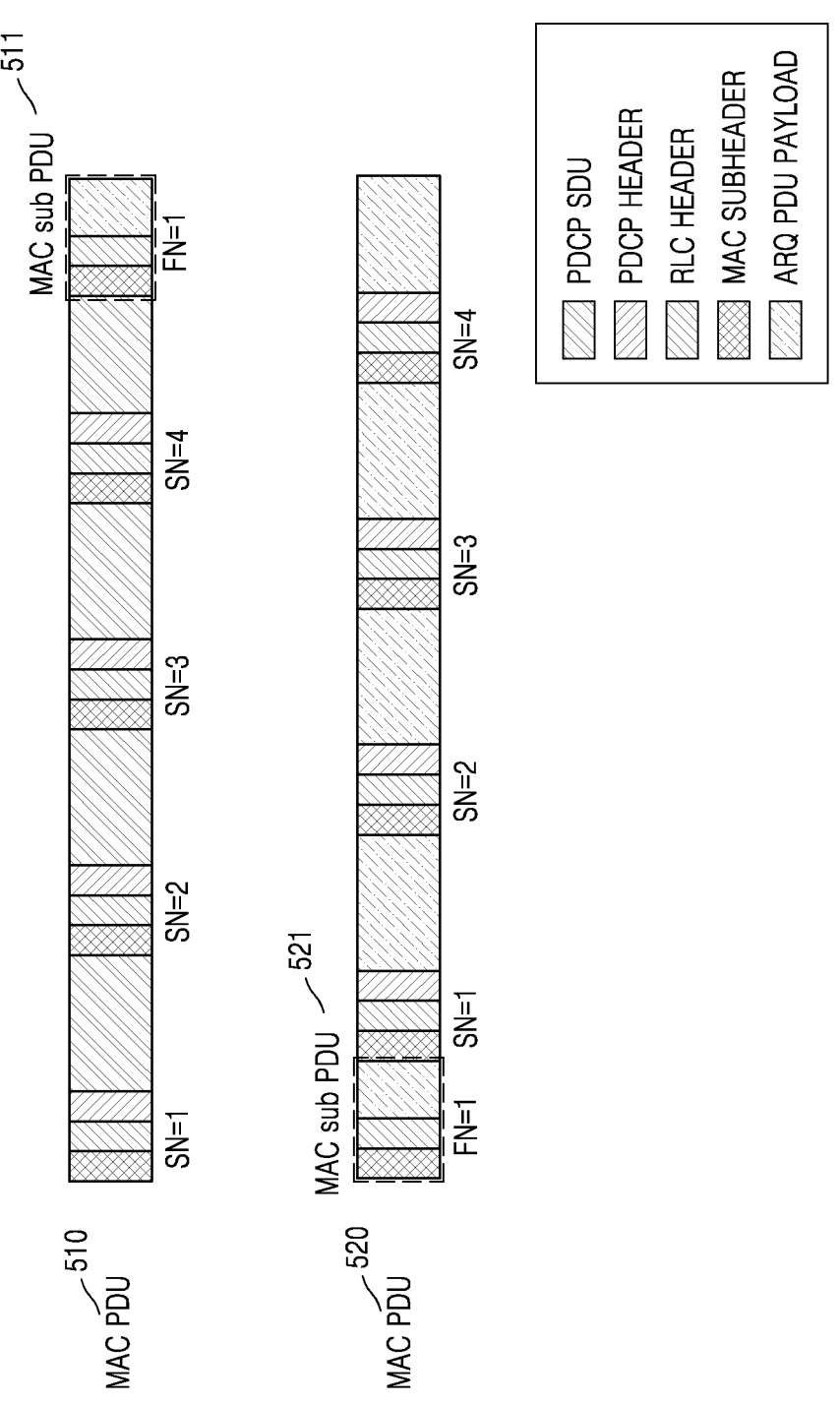
FIG. 5 is a diagram for describing a location of an MAC sub PDU corresponding to an ARQ PDU in an MAC PDU, according to an embodiment of the disclosure.

FIG. 5 is a diagram for describing a location of an MAC sub PDU corresponding to an ARQ PDU in an MAC PDU, according to an embodiment of the disclosure.

An MAC sub PDU 511 or 521 may be located in anywhere in an MAC PDU 510 or 520. The MAC sub PDU 511 or 521 refers to one including an ARQ PDU and an MAC sub header concatenated with the ARQ PDU. For example, the MAC sub PDU 511 may be located in the last portion of the MAC PDU 510, and the MAC sub PDU 521 may be located in the first portion of the MAC PDU 520.

In an embodiment of the disclosure, the MAC sub PDU 511 may be located in the last portion of the MAC PDU 510. In this case, the RLC layer of the receiving device has an advantage of being able to process RLC data PDUs first even before processing the ARQ PDU and send a result of the processing to a higher layer.

In another embodiment of the disclosure, the MAC sub PDU 521 may be located in the first portion of the MAC PDU 520. The RLC layer of the receiving device may process the ARQ PDU before the RLC data PDUs, and thus gain an effect of further reducing the load of RLC operations. Especially, for the MAC PDU 520, as the ARQ PDU and the RLC data PDUs may be sequentially processed one by one in the same core and it is easy to apply a result of processing the ARQ PDU to processing the RLC data PDUs, the MAC sub PDU 521 located in the first portion of the MAC PDU 520 may be effective in a single core environment. In other words, as compared to a multi-core environment in which the ARQ PDU and the RLC data PDUs are likely to be processed in different cores, the MAC sub PDU 521 located in the first portion of the MAC PDU 520 may be effective in the single core environment.

Alternatively, the MAC sub PDU corresponding to the ARQ PDU may be located in the middle of the MAC PDU (not shown). In this case, the MAC sub PDU corresponding to the ARQ PDU may have part of the advantages gained when the MAC sub PDU is located in the first or last portion of the MAC PDU.

Although the MAC PDU 510 or 520 including a single RLC frame is shown in FIG. 5 for convenience of explanation, what are described above may be equally applied to an occasion when the MAC PDU includes a plurality of RLC frames and MAC sub headers (not shown). The plurality of RLC frames may include a plurality of ARQ PDUs and RLC data PDU sets corresponding to the plurality of ARQ PDUs. In this case, the MAC PDU may include MAC sub PDUs in which the plurality of ARQ PDUs are each concatenated with an MAC subheader (hereinafter, MAC sub PDUs corresponding to the plurality of ARQ PDUs), and a set of MAC sub PDUs in which RLC data PDUs in an RLC data PDU set corresponding to each ARQ PDU are each concatenated with an MAC subheader (hereinafter, an MAC sub PDU set). The MAC sub PDUs corresponding to the plurality of ARQ PDUs may be each located in every leading or ending portion of the corresponding MAC sub PDU set.

Figure 6:
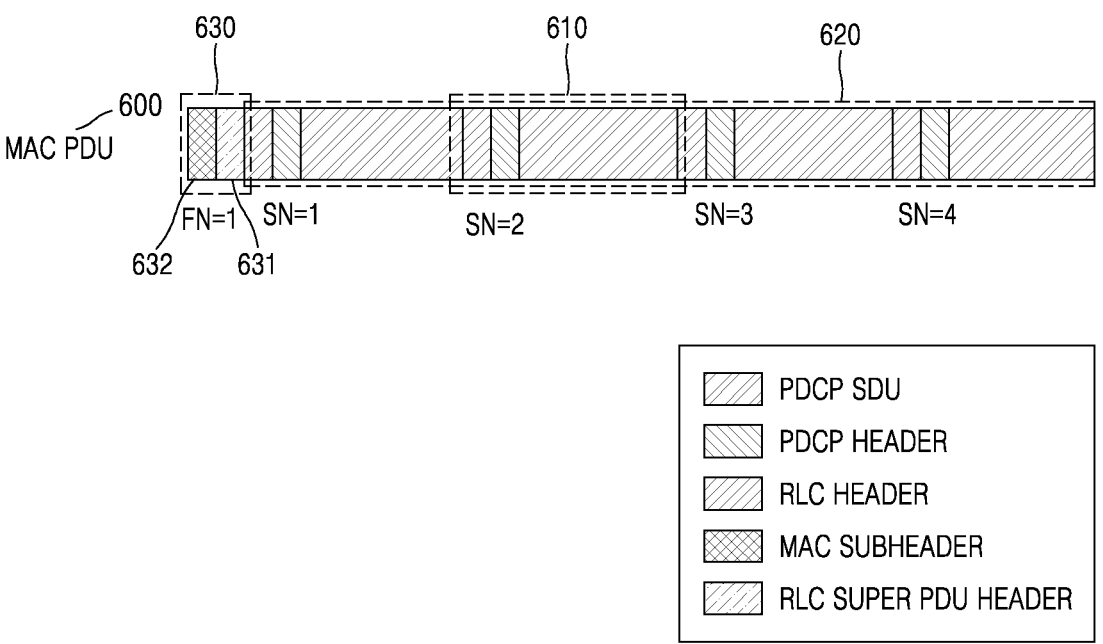
FIG. 6 is a diagram for describing another structure for transmitting radio link control (RLC) data PDUs, according to an embodiment of the disclosure.

FIG. 6 is a diagram for describing another structure for transmitting RLC data PDUs, according to an embodiment of the disclosure.

Specifically, referring to FIG. 6, an RLC super PDU 631 and 620 may be transmitted in the format of data, and an MAC subheader 632 may be attached to the RLC super PDU 631 and 620. Furthermore, the RLC super PDU header 631 of the RLC super PDU 631 and 620 may include information for processing an operation related to the RLC super PDU 631 and 620. The transmitting device may generate the RLC super PDU 631 and 620 including the plurality of RLC data PDUs 620 including an RLC data PDU 610 and send the RLC super PDU 631 and 620 to the MAC layer. The transmitting device may add information otherwise included in the ARQ PDU to the RLC super PDU header 631 without separately generating the ARQ PDU. That is, the transmitting device may generate the RLC super PDU header 631 in the RLC layer.

The MAC PDU 600 may include the RLC super PDU 620 and 631 comprised of a plurality of RLC data PDUs and the RLC super PDU header 631, and the MAC subheader 632. The MAC subheader 632 may include information for processing an operation related to the RLC super PDU 620 and 631. The MAC PDU 600 may include a plurality of RLC super PDUs and the respective MAC subheaders (not shown).

As operations for the plurality of RLC data PDUs 620 may be collectively processed by processing the RLC super PDU header 631, overhead of the RLC operation may be reduced. Furthermore, unlike an MAC subheader generated for each of the plurality of RLC data PDUs, the MAC subheader 632 is generated only for the RLC super PDU 631 and 620, such that the overhead of the MAC subheader itself may be reduced.

Figure 7A:
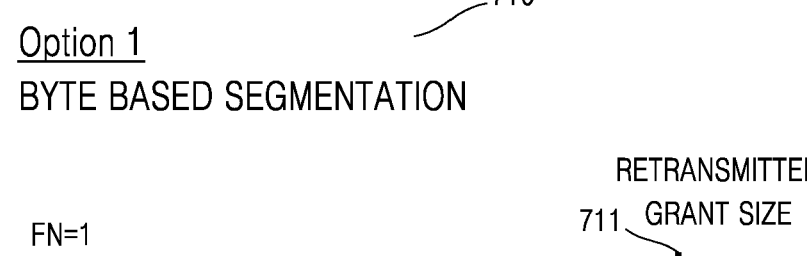
FIG. 7A is a diagram for describing segmentation of an RLC data PDU set on a byte basis, according to an embodiment of the disclosure.
Figure 7A:
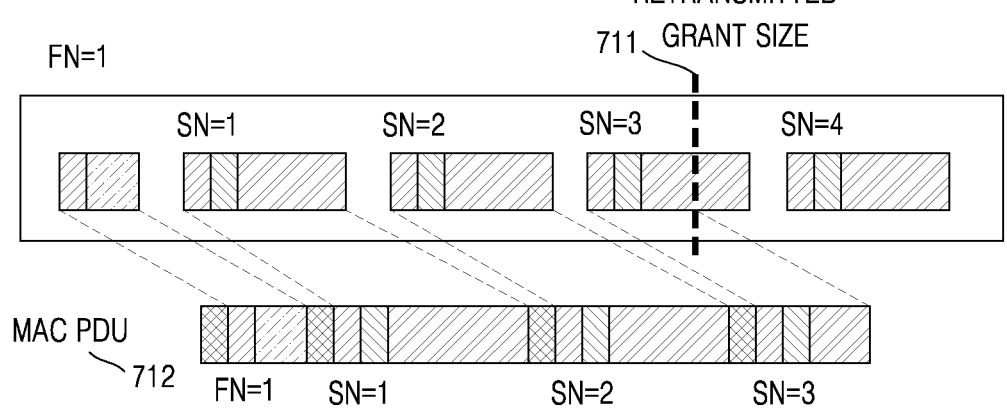

FIG. 7A is a diagram for describing segmentation of an RLC data PDU set on a byte basis, according to an embodiment of the disclosure.

The RLC entity of the transmitting device may receive resource allocation information from the MAC layer, and resources may be allocated on a byte basis. As the RLC entity determines an RLC data PDU set for transmission based on resource allocation information, an RLC data PDU set to be transmitted for the first time (hereinafter, RLC data PDU set for initial transmission or initial RLC data PDU set) is not required to be segmented. Specifically, when the resource allocation is not enough to transmit the first RLC data PDU to the n-th RLC data PDU and the ARQ PDU, a certain RLC SDU may be segmented. In other words, the RLC data PDU set for initial transmission includes a segmented RLC SDU based on a resource allocation, and the RLC data PDU set itself for initial transmission is not segmented.

Furthermore, when the n-th RLC SDU is segmented, the size of an RLC header to be concatenated with the n-th RLC SDU may be changed according to the segmented n-th RLC SDU. In the case that the n-th RLC SDU is segmented, the transmitting device may add information about the segmented n-th RLC SDU (e.g., segmentation information) to the RLC header corresponding to the segmented n-th RLC SDU. In this case, an RLC data PDU set based on a resource allocation may be determined by considering the changed size of the RLC header. Specifically, the RLC entity of the transmitting device may determine an RLC data PDU set including the first RLC SDU to the n-th RLC SDU, at least a portion of the n-th RLC SDU and RLC headers, and an ARQ PDU. In other words, the transmitting device may generate the ARQ PDU corresponding to the RLC data PDU set including a plurality of RLC data PDUs having the plurality of RLC SDUs (or segmented RLC SDUs) concatenated with respective RLC headers. As described above, the RLC data PDUs and the ARQ PDU that may be included in an MAC PDU may be determined based on the resource allocation information.

When the status PDU includes NACK, the RLC entity of the transmitting device may determine at least a portion of the RLC data PDU set for retransmission based on a resource allocation. Specifically, when the status PDU includes NACK and the resource allocation is enough, the transmitting device may retransmit the RLC data PDU set based on the NACK. When the resource allocation for retransmission is smaller than transmission resources required for transmitting the RLC data PDU set, the RLC entity may segment some of the RLC SDUs included in the RLC data PDU set on a byte basis.

FIG. 7A is a diagram for describing segmentation 710 of an RLC data PDU set on a byte basis, according to an embodiment of the disclosure. The RLC entity of the transmitting device may determine a first RLC frame according to resource allocation information. Specifically, the first RLC frame may include a plurality of RLC data PDUs corresponding to sequence numbers 1 to 4 and an ARQ PDU corresponding to the plurality of RLC data PDUs. The transmitting device may transmit a first MAC PDU (not shown) including the first RLC frame to the receiving device through a lower layer. When the RLC data PDU set is not received and a certain condition is met, the receiving device may transmit a status PDU including NACK. On receiving the status PDU including NACK, the transmitting device may determine to retransmit the RLC data PDU set.

Referring to FIG. 7A, an allowable retransmission size 711 allocated by the MAC layer to each RLC entity may be smaller than the size of the first RLC frame and may be on a byte basis. Specifically, the allowable retransmission size 711 may be a size including RLC SDUs corresponding to sequence numbers 1 and 2, at least a portion of an RLC SDU corresponding to sequence number 3, an ARQ PDU, and RLC headers. In other words, the first RLC frame may be segmented according to the allowable retransmission size 711, and the segmentation of the first RLC frame refers to segmentation of an RLC SDU included in the first RLC frame. In the following description, an RLC frame is used as a concept including a whole RLC frame or a segmented RLC frame, and when differentiation is needed, it may be separately specified as the segmented RLC frame or the whole RLC frame. As described above, when segmentation of an RLC SDU is performed on a byte basis, the size of the RLC header may be changed and the segmented RLC data PDU set (hereinafter, an RLC data PDU set for retransmission) may be determined by taking the changed size of the RLC header into account. Specifically, the transmitting device may segment the RLC data PDU set including the RLC data PDUs corresponding to sequence numbers 1 to 4 based on the allowable retransmission size 711. In this case, the transmitting device may segment the RLC data PDU set for initial transmission on a byte basis, and the RLC data PDU set for retransmission may include the RLC data PDUs corresponding to sequence numbers 1 and 2, a portion of the RLC SDU corresponding to sequence number 3, and an RLC header including information (e.g., segmentation information) about the RLC SDU corresponding to the sequence number 3. In this case, one including the portion of the RLC SDU corresponding to the sequence number 3 and the RLC header including information about the RLC SDU is also an RLC data PDU. That is, one including a portion of an RLC SDU and an RLC header corresponding to the RLC SDU also corresponds to an RLC data PDU.

Furthermore, the transmitting device may update the ARQ PDU based on the RLC data PDU set for retransmission. Specifically, the ARQ PDU may include information about the RLC data PDU set for retransmission. The transmission device may generate a second MAC PDU 712 based on the RLC data PDU set for retransmission and the updated ARQ PDU. The second MAC PDU 712 may include the RLC data PDU set for retransmission, the updated ARQ PDU, and the MAC subheaders. In this case, a sum of sizes of the RLC data PDUs included in the RLC data PDU set for retransmission and the updated ARQ PDU may correspond to the allowable retransmission size 711. In other words, in a case of using resources on a byte basis, allocated resources may all be used. In this case, the ARQ PDU included in an MAC sub PDU in the second MAC PDU 712 may include information about the segmentation, and the information about the segmentation may include at least one of information about whether segmentation is made, information about a unit of segmentation, information about a location of segmentation, a starting point of segmentation, an ending point of segmentation, or information about an offset from the starting point of segmentation.

Figure 7B:
FIG. 7B is a diagram for describing segmentation of an RLC data PDU set on an RLC service data unit (SDU) basis, according to an embodiment of the disclosure.
Figure 7B:
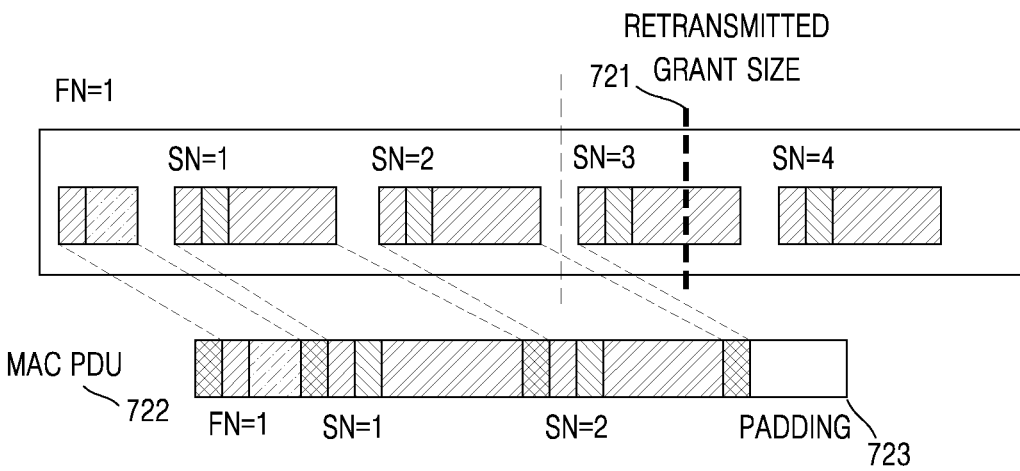

FIG. 7B is a diagram for describing segmentation of an RLC data PDU set on an RLC SDU basis, according to an embodiment of the disclosure.

The description of the RLC data PDU set for initial transmission is the same as what is described above in connection with FIG. 7A, so it will not be repeated. When the receiving device determines based on the ARQ PDU that the RLC data PDU set for initial transmission is not received and a certain condition is met, the receiving device may transmit a status PDU including NACK. When the status PDU including NACK is received, the transmitting device may retransmit the RLC data PDU set.

Referring to FIG. 7B, an allowable retransmission size 721 allocated by the MAC layer to each RLC entity may be smaller than the size of the first RLC frame and may be on a byte basis. Specifically, the allowable retransmission size 721 may be a size including an RLC SDU corresponding to sequence number 1, an RLC SDU corresponding to sequence 2, a portion of an RLC SDU corresponding to sequence number 3, an ARQ PDU, and RLC headers. In this case, the transmitting device may segment the RLC data PDU set for initial transmission based on the allowable retransmission size 721. The transmitting device may segment the RLC data PDU set on an RLC SDU basis, and the segmented RLC data PDU set (or RLC data PDU set for retransmission) may include RLC data PDUs corresponding to sequence numbers 1 and 2. A second MAC PDU 722 generated based on the segmented RLC data PDU set may include not only an ARQ PDU, the RLC data PDUs corresponding to sequence numbers 1 and 2, and MAC subheaders, but also at least one of padding bit(s) in a remaining resource 723, an RLC PDU (not shown) from another RLC entity, an MAC subheader (not shown) or an MAC control element (not shown).

In other words, the transmitting device may update the ARQ PDU based on the segmented RLC data PDU set. Specifically, the ARQ PDU may include information about the segmented RLC data PDU set. The transmission device may generate a second MAC PDU 722 based on the segmented RLC data PDU set and the updated ARQ PDU. The second MAC PDU 722 may include a maximum number of RLC SDUs that may be included in the allowable retransmission size 721 without segmentation. Specifically, referring to FIG. 7B, the second MAC PDU 722 may include the ARQ PDU, the RLC data PDUs corresponding to sequence numbers 1 and 2, and the MAC subheaders. In other words, as the RLC entity of the transmitting device may not include the whole RLC SDU corresponding to the sequence number 3 according to the resource allocation, the second MAC PDU 722 may include the ARQ PDU, the RLC data PDUs corresponding to the sequence numbers 1 and 2, and the MAC subheaders. In this case, as the size of the segmented RLC frame for retransmission is smaller than the allowable retransmission size 721, the transmitting device may add at least one of the padding bit(s), an RLC PDU (not shown) from another RLC entity, an MAC subheader (not shown), or an MAC control element (not shown) to the remaining resource 723. Furthermore, when the segmentation is performed on an RLC SDU basis, an RLC operation may be simplified.

In an embodiment of the disclosure, the transmitting device may retransmit at least a portion of the RLC data PDU set for which NACK is received, based on the resource allocation information. In this case, the transmitting device may generate an MAC PDU (not shown) in the MAC layer, which includes not only the segmented RLC data PDU set but also a new RLC data PDU set (the RLC data PDU set for initial transmission) based on the resource allocation information.

When the MAC PDU has a large size (i.e., when the size of a resource allocated for the RLC entity is large), using resources on a byte basis may be relatively less effective. For example, using a 1-byte resource when the size of an MAC PDU is 10 bytes has higher efficiency than using the 1-byte resource when the size of the MAC PDU is 1000 bytes. In other words, it may be more efficient to simplify the RLC operation by performing the segmentation on an RLC SDU basis the larger the size of the MAC PDU.

To perform the segmentation on a byte basis, the transmitting device requires information about a point where the segmentation occurs (segment offset, SO). Hence, the type or structure of a header for the RLC data PDUs may be complicated, and of RLC operations, an operation for processing the corresponding information also has a heavy load of packet processing. In the meantime, when the segmentation is performed on an RLC SDU basis, the type or structure of the header for RLC PDUs may be simplified and the associated processing operation may also be simplified.

Figure 8A:
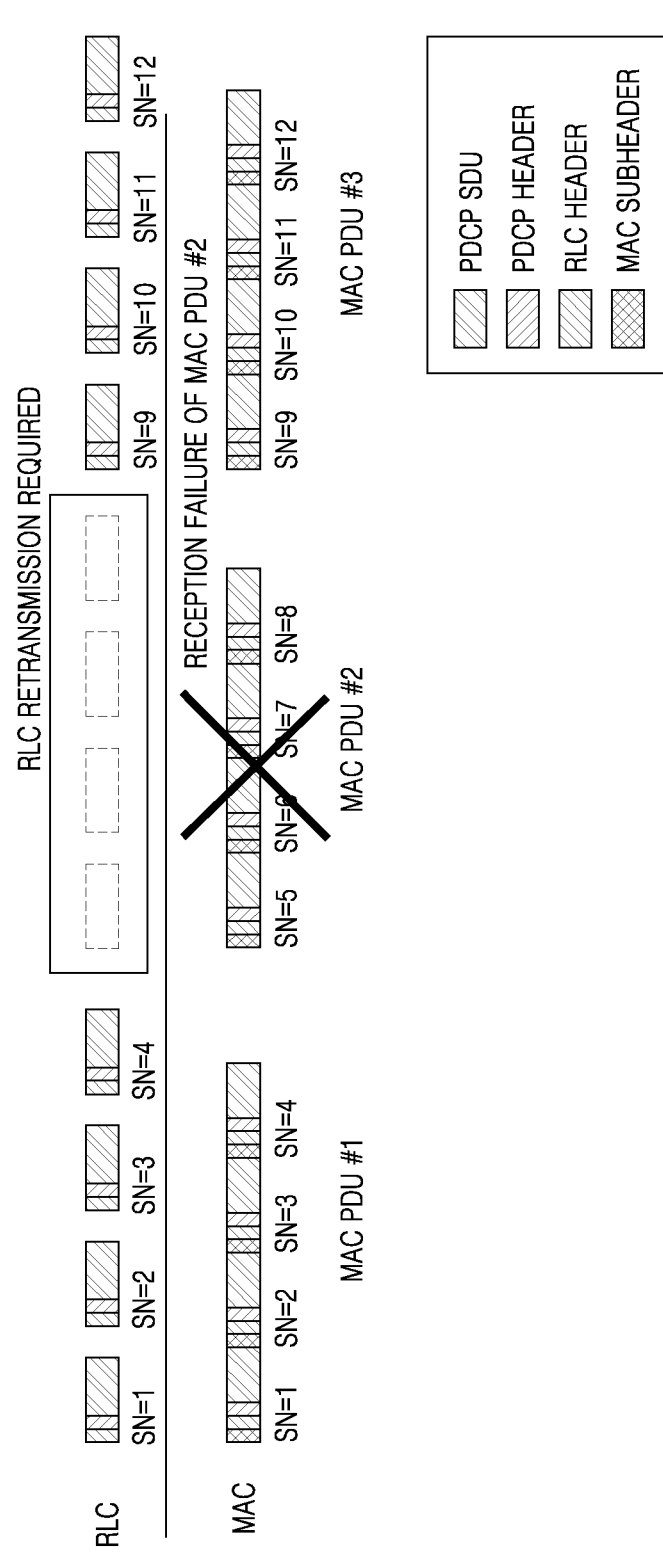
FIG. 8A is a diagram for describing the existing ARQ related operation, according to an embodiment of the disclosure.

FIG. 8A is a diagram for describing the existing ARQ related operation, according to an embodiment of the disclosure.

When the transmitting device transmits MAC PDU #1 to MAC PDU #3, the receiving device may receive the MAC PDUs through a lower layer. Specifically, the transmitting device may transmit the MAC PDU #1 to MAC PDU #3, and when the receiving device fails to receive at least one of the MAC PDU #1 to MAC PDU #3, the receiving device may perform an operation for RLC data PDUs in the RLC layer based on the respective RLC data PDUs. The receiving device may perform the RLC layer operation for the RLC data PDUs by referring to each of the RLC data PDUs or an RLC header concatenated to each of the RLC data PDUs. Specifically, the receiving device needs to perform an operation of the RLC layer (e.g., an ARQ related operation) based on the respective RLC data PDUs corresponding to sequence numbers 1 to 12.

Referring to FIG. 8A, the receiving device may determine whether RLC SDUs corresponding to sequence numbers 5 to 8 are received based on each of 12 RLC data PDUs, and based on a result of the determining, request retransmission of the RLC SDUs corresponding to the sequence numbers 5 to 8 from the transmitting device. The receiving device needs to determine whether the RLC SDUs are received based on the respective RLC data PDUs, there is a problem of heavy load of the ARQ related operation.

FIG. 8B is a diagram for describing the existing sequence number based RLC operation, according to an embodiment of the disclosure.

Referring to FIG. 8B, the receiving device may update state variables based on segmentation information for RLC SDUs and sequence numbers included in RLC headers of received RLC data PDUs in the RLC layer (800). Specifically, when an RLC data PDU including a whole RLC SDU (a non-segmented RLC SDU) corresponding to sequence number 1 is received, the receiving device may update a state variable RX_Next indicating an RLC SDU to be next received to '2'. Furthermore, when an RLC data PDU including a whole RLC SDU corresponding to sequence number 2 is received, the receiving device may update the state variable RX_Next indicating an RLC SDU to be next received to '3'. On the other hand, when only a portion of the RLC SDU corresponding to the sequence number 2 is received, the receiving device may not update the parameter RX_Next to '3' because it failed to completely receive the RLC SDU corresponding to the sequence number 2. The state variable RX_Next indicates a sequence number right after the last sequence number of the whole RLC SDUs received without a hole in order of sequence numbers. The hole refers to missing RLC SDU(s) or a portion (portions) of an RLC SDU in the middle of the received RLC SDU(s). Furthermore, the receiving device may perform an RLC operation based on the respective RLC data PDUs.

Referring to FIGS. 8A and 8B, the receiving device receives an RLC data PDU including a whole RLC SDU corresponding to sequence number 4 and updates the state variable Rx_Next to 5, but may receive RLC data PDUs including RLC SDUs corresponding to sequence numbers 9 to 12 instead of a whole RLC SDU corresponding to the sequence number 5. In this case, a state variable indicating a sequence number right after the highest sequence number of the received RLC SDUs, i.e., Rx_Next_Highest, may be updated to 13. The receiving device may find that there is a hole of missing RLC SDU(s) or a missing portion (or missing portions) of an RLC SDU in the middle of the received RLC SDU(s) based on the state variable Rx_Next and the state variable Rx_Next_Highest. Specifically, the receiving device may transmit, to the transmitting device, a status PDU including information indicating that the whole RLC SDU corresponding to the sequence number 5 has not been received (e.g., NACK).

Furthermore, referring to FIG. 8B, an operation related to ARQ and packet discarding (810) may be performed based on the updating of the state variable (800) as described above. In other words, for each RLC data PDU, the operation related to ARQ and packet discarding (810) may be performed. For example, the receiving device may determine whether the sequence numbers of a plurality of RLC data PDUs are included in a receiving window. Specifically, the receiving device may determine that only the sequence number (SN) that satisfies state variable RX_Next<=sequence number (SN) of received RLC data PDU<state variable RX_Next+receiving window size RX_Window_Size is included in the receiving window, and discard RLC data PDUs corresponding to the other sequence numbers that are not included in the receiving window. The RX Window size refers to a size of the receiving window. Furthermore, the receiving device may determines based on the sequence number(s) whether a plurality of RLC SDUs have been redundantly received, and discard the redundantly received RLC SDUs or some of the RLC SDUs.

Figure 9A:
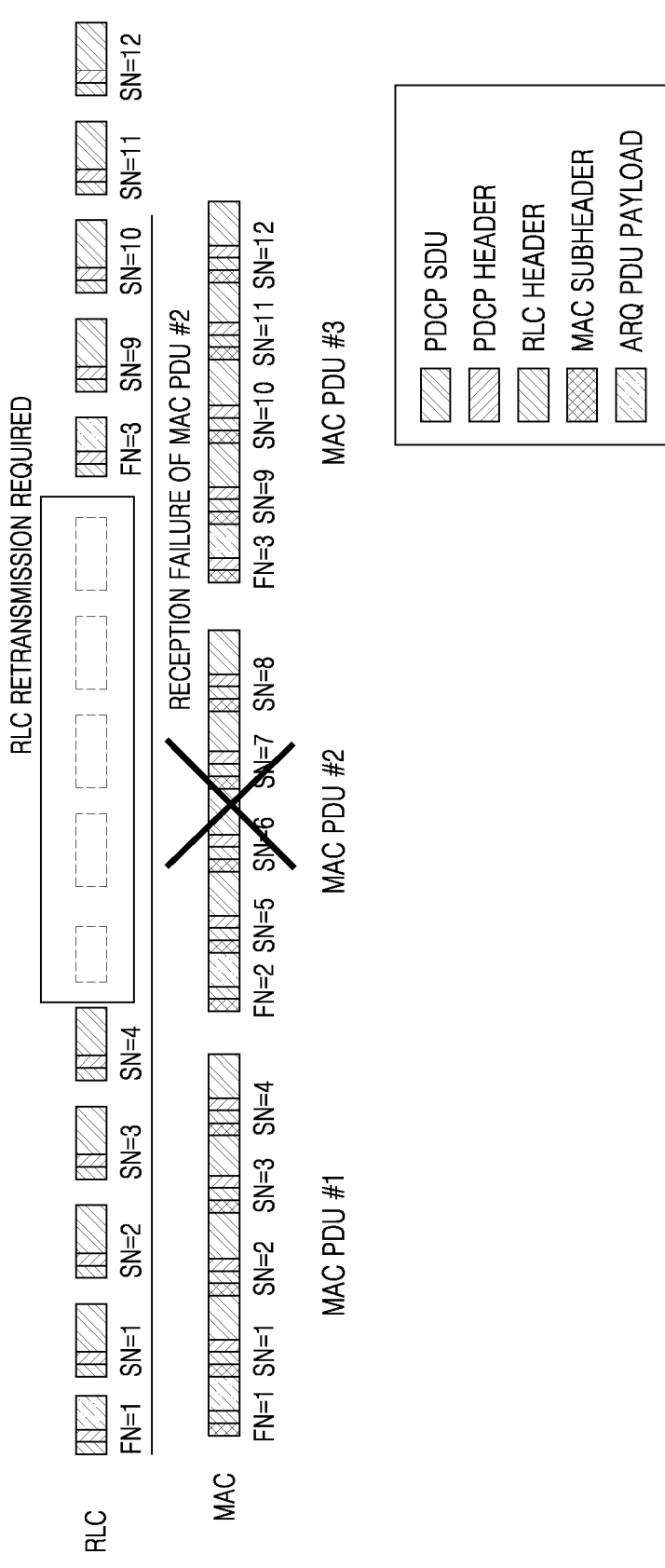
FIG. 9A is a diagram for describing ARQ PDU based RLC operations, according to an embodiment of the disclosure.
Figure 9B:
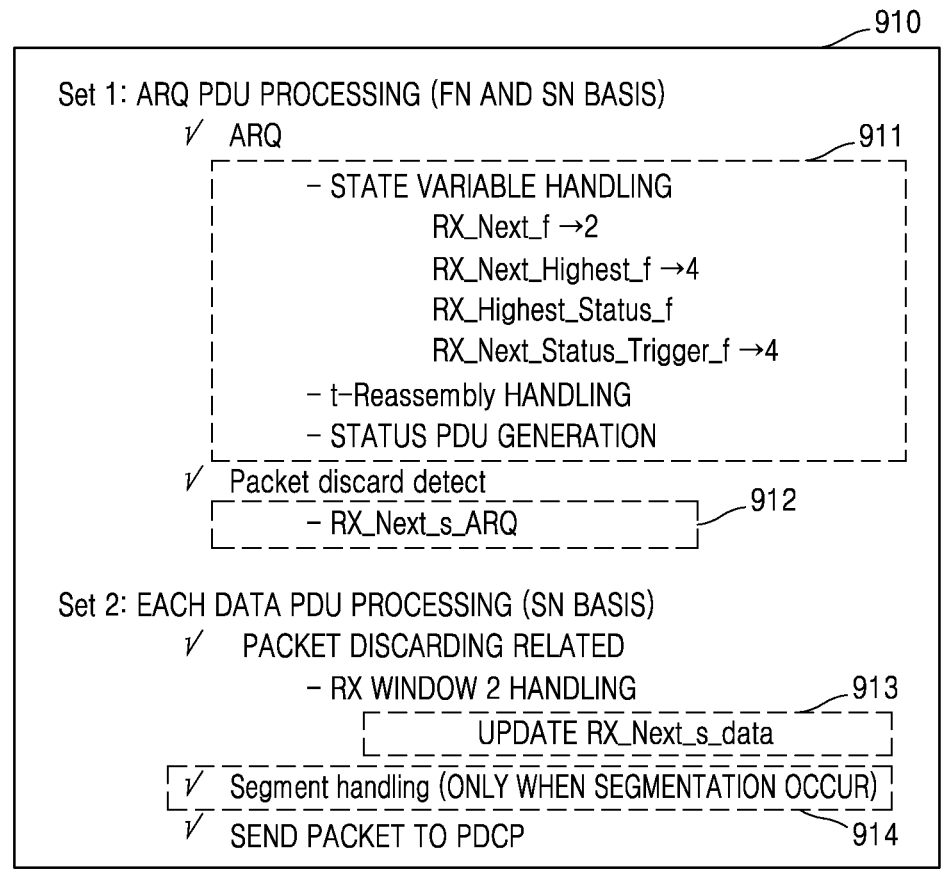
FIG. 9B is a diagram for describing ARQ PDU based RLC operations, according to an embodiment of the disclosure.

Moreover, of ARQ related operations, t-Reassembly handling and status PDU generation 820 may also be performed based on the sequence numbers included in the respective RLC data PDUs. In addition, when segmentation of an RLC SDU occurs, segmentation handling 830 may also be performed for each of the RLC data PDUs. That is, for all the updating of state variables 800, the operation related to ARQ and packet discarding 810, the t-Reassembly handling and status PDU generation 820, and the segmentation handling 830, RLC data PDUs may be processed on a sequence number basis. In the meantime, the aforementioned operations 800, 810, 820 and 830 correspond to operations having relatively high loads of packet processing when operated on the sequence number basis, and a scheme for reducing the packet processing load that occurs for each RLC data PDU in an ultrahigh data rate environment where plenty of RLC data PDUs need to be processed within a short period of time is required. Referring to FIGS. 9A to 9C, ARQ PDU based RLC operations according to an embodiment of the disclosure will now be described.

FIG. 9A is a diagram for describing ARQ PDU based RLC operations, according to an embodiment of the disclosure.

When the transmitting device transmits MAC PDU #1 to MAC PDU #3, the receiving device may receive the MAC PDUs through a lower layer. Specifically, when the transmitting device transmits the MAC PDU #1 to MAC PDU #3, and the receiving device fails to receive at least one of the MAC PDU #1 to MAC PDU #3, the receiving device may perform an RLC operation for the RLC frames based on the ARQ PDUs in the RLC layer. Referring to FIG. 9A, an occasion where each of MAC PDU #1 to MAC PDU #3 includes first RLC frame (RLC data PDUs corresponding to sequence numbers 1 to 4) to third RLC frame (RLC data PDUs corresponding to sequence numbers 9 to 19) will be described.

In an embodiment of the disclosure, the receiving device may perform an operation for an RLC frame corresponding to an ARQ PDU based on the ARQ PDU. Specifically, the receiving device may update the state variable based on the ARQ PDUs corresponding to frame numbers 1 to 3 without a need to update the state variable for each of RLC data PDUs corresponding to sequence numbers 1 to 12.

Referring to FIG. 9A, when it is determined based on the updated state variable that an ARQ PDU corresponding to the frame number 2 has not been received, and a certain condition is satisfied, the receiving device may transmit a status PDU including information indicating that the second RLC frame has not been received (e.g., NACK information) to the transmitting device. Accordingly, the transmitting device may perform an ARQ related operation for the second RLC frame. Specifically, the receiving device may perform an RLC operation related to the first to third RLC frames based on the three ARQ PDUs corresponding to the frame numbers 1 to 3.

FIG. 9B is a diagram for describing ARQ PDU based RLC operations, according to an embodiment of the disclosure.

Referring to FIG. 9B, the receiving device may determine based on information included in at least one ARQ PDU whether sequence numbers corresponding to a plurality of RLC data PDUs are included in a receiving window, and discard an RLC data PDU corresponding to a sequence number that is not included in the receiving window among the plurality of RLC data PDUs. In this case, the information included in the ARQ PDUs may include information about sequence numbers of the respective RLC data PDUs. For example, referring to FIG. 9A, an ARQ PDU corresponding to the frame number 1 may include information about sequence numbers 1 to 4 of RLC data PDUs. Specifically, the receiving device may determine whether the sequence numbers of RLC data PDUs in the RLC frame are within the receiving window through a state variable RX_Next_s_ARQ 912 managed based on information included in the ARQ PDU. The state variable RX_Next_s_ARQ indicates a sequence number right after the last sequence number of the whole RLC SDUs received without a hole in order of sequence numbers. Specifically, the receiving device may determine that a sequence number (SN) that satisfies the state variable RX_Next_s_ARQ 912<=sequence number (SN)<state variable RX_Next-_s_ARQ 912+receiving window size RX_Window_Size is within the receiving window. In other words, the receiving device may detect whether an RLC data PDU is discarded based on the sequence number based state variable RX_Next_s_ARQ 912 and the receiving window, and update information about a receiving condition of an RLC frame. Specifically, the receiving device may manage the state variable RX_Next_s_ARQ 912 based on information included in the ARQ PDU in the RLC frame, and detect whether the RLC data is discarded PDU based on the state variable RX_Next_s_ARQ 912.

The receiving device may require information about a receiving condition for RLC frames corresponding to the sequence numbers or the frame number in the receiving window so as to generate a status PDU. The receiving condition may be managed based on information in the ARQ PDU. For convenience of explanation, RLC SDUs included in the RLC data PDU set for initial transmission, which are concatenated in sequence, are referred to as an RLC SDU set. For example, the receiving condition of the RLC frames may indicate that the whole RLC SDU set in the first RLC frame has been received (hereinafter, which is described as the whole RLC frame received when the whole RLC SDU set is received, for convenience of explanation), the second RLC frame has not been received, and only 0 to 100 bytes of an RLC SDU set in the third RLC frame have been received (hereinafter, which is described as a portion of the RLC frame received when a portion of the RLC SDU set is received, for convenience of explanation). When all or a portion of an RLC SDU set in an RLC frame is discarded, the fact that all or the portion of the RLC SDU set in the RLC frame has not been received needs to be reflected in the receiving condition. For example, even when actual discarding occurs in processing the RLC data PDU including the RLC SDU, whether a portion or the whole of an RLC SDU set in the RLC frame is discarded may be detected based on the ARQ PDU to manage the receiving condition.

In this case, the packet discarding operation may be performed according to sequence number based handling of the state variable. Specifically, the receiving device may discard an RLC data PDU based on a state variable RX_Next_s_data 913 and the receiving window. The state variable RX_Next_s_data indicates a sequence number right after the last sequence number of the whole RLC SDUs received without a hole in order of sequence numbers. That is, the receiving device may discard an RLC data PDU based on the state variable RX_Next_s_data 913. In other words, the receiving device may determine a sequence number that satisfies the state variable RX_Next_s_data 913<=sequence number (SN)<state variable RX_Next_s_data 913+receiving window size RX_Window_Size as being in the receiving window, and discard RLC data PDUs corresponding to sequence numbers outside the receiving window. Furthermore, the receiving device may update the state variable RX_Next_s_data 913 based on a sequence number in an RLC header of an RLC data PDU in processing the RLC data PDU, and perform packet discarding depending on whether the sequence number is within the receiving window based on the state variable RX_Next_s_data 913.

As such, when the state variable RX_Next_s_ARQ 912 managed based on the ARQ PDU to detect whether the RLC data PDU is discarded and the state variable RX_Next_s_ data 913 managed based on the RLC header in the RLC data PDU to actually perform discarding of the RLC data PDU are separately managed, the result of processing the ARQ PDU does not affect the processing of the RLC data PDU, so there is no limitation on the processing order between the ARQ PDU and the RLC data PDU, which may be advantageous in the multi-core and pipelining perspective.

In another embodiment of the disclosure, detection of whether one of ARQ PDU processing operations, e.g., packet discarding, is performed may be performed based on the state variable RX_Next_s_data managed based on the sequence number in the RLC header of the RLC data PDU without having an extra state variable RX_Next_s_ARQ managed based on the sequence number in the ARQ PDU. In this case, the state variable RX_Next_s_data may be a variable shared between the ARQ PDU processing operation and the RLC data PDU processing operation. Operations related to the shared variable may cause performance restriction in a certain multi-core based environment.

As described above, the receiving device may manage sequence number based receiving windows. In another embodiment of the disclosure, the receiving device may also manage frame number based receiving window, which will be described in connection with FIG. 9C.

Referring to FIG. 9B, the receiving device may perform ARQ related operations 911 based on the frame number. The ARQ related operation 911 performed based on the frame number may include handling of state variables, t-Reassembly handling, and an operation related to generation of a status PDU. Specifically, when an ARQ PDU corresponding to frame number 1 is received, the receiving device may update a state variable RX_Next_f indicating an RLC frame to be next received to '2'. On the other hand, when a portion of the first RLC frame is received even though the ARQ PDU corresponding to the frame number 1 is received (when a portion of the first RLC frame is not received given the previous reception), the state variable RX_Next_f may not be updated to '2'. In this case, as the state variable RX_Next_f remains in the state of being '1', the state variable Rx_Next_f may not be updated because a portion of the first RLC frame has not yet been received even when the whole of the second RLC frame has been received. The receiving device may determine whether a plurality of RLC data PDUs are received based on ARQ PDUs.

As such, the state variable RX_Next_f indicates a frame number right after the last frame number of the whole RLC frames received without a hole in order of frame numbers. In other words, the state variable RX_Next_f may indicate that the received RLC frames before a value corresponding to the state variable RX_Next_f were all the complete RLC frames. Specifically, when an ARQ PDU is received, it is determined based on information in the ARQ PDU and information about a receiving condition of the RLC frame managed by the receiving device that a whole RLC frame having a frame number included in the ARQ PDU has been received, and when the frame number is identical to the value of the existing state variable RX_Next_f, the value of the state variable RX_Next_f may be updated to a frame number of an RLC frame having the smallest frame number among RLC frames corresponding to larger frame numbers than the value of the existing state variable RX_Next_f but having not been completely received (a portion or all of which has not been received).

Referring to FIGS. 9A and 9B, when an ARQ PDU corresponding to frame number 3 instead of an ARQ PDU corresponding to frame number 2 is received, a state variable Rx_Next_Highest_f may be updated to '4'. The state variable Rx_Next_Highest_f may indicate a frame number right after the highest frame number of the received RLC frames. Specifically, in reception of an ARQ PDU, when the corresponding frame number is equal to or greater than the existing state variable Rx_Next_Highest_f, the value of the state variable Rx_Next_Highest_f may be updated to the corresponding frame number+1.

Furthermore, the receiving device may find that there is a missing RLC frame (RLC frames) or a missing portion (or portions) of the RLC frame in the middle of the received RLC frames based on the state variable Rx_Next_f and the state variable Rx_Next_Highest_f. In other words, the receiving device may find that there is a hole in receiving RLC SDU sets based on the fact that there is a missing RLC frame (or RLC frames) or a portion (or portions) of the RLC frame in the middle of the received RLC frames. The receiving device may transmit a status PDU including information indicating that the second RLC frame corresponding to the frame number 2 has not been received (e.g., NACK) to the transmitting device when a certain condition is satisfied, based on the state variable being 2 and the state variable Rx_Next_Highest_f being 4.

A state variable RX_Highest_Status_f may indicate the highest frame number that may be included for the value of an ACK_FN field in the status PDU. The ACK_FN field may be included in the status PDU, and may include a frame number of an RLC frame right after complete reception has not been done except the RLC frames including NACK information in the status PDU. Specifically, for RLC frames that have not been completely received among RLC frames corresponding to frame numbers equal to or smaller than the state variable RX_Highest_Status_f, a point in time when the status PDU is generated may be after a t-Reassembly timer (a timer for detecting a failure of reception of an RLC frame in a lower layer) is started and expired (i.e., a point in time after a certain period of time elapses) after a failure of reception of at least a portion of the RLC frames is detected. The RLC frames corresponding to the frame numbers equal to or smaller than the state variable RX_Highest_Status_f are targets for generating the status PDU (RLC ACK/NACK). In other words, as RLC frames having larger frame numbers than the state variable RX_Highest_Status_f are not targets for generating the status PDU even when the generation of the status PDU is triggered, associated ACK/NACK information is not included in the status PDU.

The state variable RX_Highest_Status_f may be updated when it is determined that a whole RLC frame having a frame number included in the corresponding ARQ PDU has been received based on information in the ARQ PDU and RLC frame receiving condition information managed by the receiving device in ARQ PDU reception and the frame number is identical to the existing state variable RX_Highest_Status_f. Specifically, the state variable RX_Highest_Status_f may be updated to a frame number of an RLC frame having the smallest frame number among RLC frames corresponding to frame numbers greater than the value of the state variable RX_Highest_Status_f and having not been completely received (a portion or the whole of which has not been received).

Furthermore, the state variable RX_Highest_Status_f may be updated to a frame number of an RLC frame having the smallest frame number among RLC frames corresponding to frame numbers greater than the value of a state variable RX_Next_Status_Trigger and having not been completely received (a portion or the whole of which has not been received).

A state variable RX_Next_Status_Trigger_f may indicate a frame number right after a frame number of an RLC frame that is received by the receiving device with a hole and triggers the t-Reassembly timer (i.e., (frame number+1) of the RLC frame that triggers the t-Reassembly). Specifically, for an RLC frame received while the t-Reassembly timer is not running, the state variable RX_Next_Status_Trigger_f may indicate a frame number of the received RLC frame plus 1, when a portion before a received portion in the RLC frame has not yet been received or at least a portion of RLC frames having frame numbers smaller than the frame number of the RLC frame has not yet been received. Referring to FIGS. 9A and 9B, while the t-Reassembly timer is not running, the state variable RX_Next_Status_Trigger_f may indicate 4, which is a frame number of the third RLC frame (corresponding to the frame number 3) received in a state of at least a portion of the second RLC frame (corresponding to the frame number 2) having not been received, plus 1. In other words, the state variable RX_Next_Status_Trigger_f may indicate a frame number of an RLC frame, which is received when the t-Reassembly timer is not running and thus cause a hole, plus 1.

The state variable RX_Next_Status_Trigger_f may be updated to a value of the state variable RX_Next_Highest_f when the t_Reassembly timer is started.

That is, the state variables Rx_Next_f, Rx_Next_Highest_f, RX_Highest_Status_f, and RX_Next_Status_Trigger_f may be managed on a frame number basis.

When an ARQ PDU is received while the t-Reassembly timer is running, associated state variables may be updated according to the aforementioned method, and then the t-Reassembly timer is stopped and reset when one or more of the following conditions are satisfied. The following conditions may be ones for determining that a hole between the received RLC frames are filled.

1) state variable RX_Next_Status_Trigger_f=state variable RX_Next_f
2) state variable RX_Next_Status_Trigger_f=state variableRX_Next_f+1, and for an RLC frame having the same frame number as the value of the state variable RX_Next_f, a total data portion (at least a portion of the RLC SDU set of the RLC frame) received by the receiving device is a continuous portion without a hole from the first portion of the RLC SDU set of the RLC frame or the entire RLC SDU set of the RLC frame
3) the state variable RX_Next_Status_Trigger_f has a value outside a frame number based receiving window and is not equal to a value of the state variable RX_Next_f+the receiving window size RX_Window_Size On the other hand, when an ARQ PDU is received when the t-Reassembly timer is not running and one or more of the following conditions are satisfied, the t-Reassembly timer may be started. The following conditions may be ones for determining that there is a hole between the received RLC frame and the previously received RLC frame.

1) state variable RX_Next_Highest_f>state variable RX_Next_f+1
2) state variable RX_Next_Status_Trigger_f=state variable RX_Next_f+1, and for an RLC frame having the same frame number as the value of the state variable RX_Next_f, there is a hole, which is a missing portion, in the middle of the total data portion (at least a portion of the RLC SDU set of the RLC frame) received by the receiving device When the t-Reassembly timer is expired and one or more of the following conditions are satisfied, the t-Reassembly timer may be started. The following conditions may be ones for determining that there is a hole between RLC frames received by the receiving device.

1) state variable RX_Next_Highest_f>state variable RX_Highest_Status_f+1
2) state variable RX_Next_Highest_f=state variable RX_Highest_Status_f+1, and for an RLC frame having the same frame number as the value of the state variable RX_Highest_Status_f, there is a hole, which is a missing portion, in the middle of the total data portion (at least a portion of the RLC SDU set of the RLC frame) received by the receiving device As described above, the ARQ related operation 911 performed on a frame number basis may include t-Reassembly handling. The ARQ related operation 911 performed on the frame number basis may also include an operation of generating the status PDU. Specifically, when the t-Reassembly timer is expired, the receiving device may trigger status reporting, generate and transmit the status PDU to the transmitting device.

For example, based on an ARQ PDU, the receiving device may generate the status PDU including information about whether an RLC frame is received on the frame number basis (including RLC ACK or RLC NACK). Specifically, when a certain condition is satisfied and the status reporting is triggered, the receiving device may generate and transmit the status PDU for the received RLC frame to the transmitting device. The condition in which the receiving device triggers status reporting is as follows:

1. a value of a polling bit field (P field) of the received ARQ PDU is set to 1, and one or more of the following conditions are satisfied
   1) packet discarding for the RLC frame occurs (i.e., discarding occurs as a portion or all of the RLC SDU in the RLC frame is redundantly received or as the sequence number or the frame number is out of the receiving window)
   2) the frame number (FN)<state variable RX_Highest_Status_f (i.e., the frame number is smaller than the state variable RX_Highest_Status_f and thus becomes a target for generating RLC ACK/NACK)
2. The t-Reassembly timer is expired (i.e., reception fails or a hole is detected)

When status reporting is triggered, the receiving device may generate and transmit the status PDU to the transmitting device.

The receiving device may generate the following status PDU including ACK/NACK information for an RLC frame that satisfies the state variable RX_Next_f<=frame number (FN)<state variable RX_Highest_Status_f.

1) when the whole RLC frame is not received, a NACK_FN field having a value of the frame number (FN) of the RLC frame is included in the status PDU
2) when there are successive missing bytes in the RLC SDU set of the RLC frame (when there is a hole in the RLC SDU set), a NACK_FN field having a value of the frame number FN of the RLC frame and an FSOstart field and an FSOend field indicating the location of a portion of the hole are included in the status PDU
3) when RLC frames having successive frame numbers are not received at all (when there is a hole including all the SDU sets of the successive RLC frames), the NACK_FN field having a value of the smallest frame number of the RLC frames and a NACK_range field indicating the number of the successive missing RLC frames (the number of successive RLC frames corresponding to the RLC SDU set included in the hole) are included in the status PDU (in which case, when only a portion of the first or the last of the successive RLC frames is not received, the FSOstart field and FSOend field indicating the corresponding location in the RLC SDU set of each RLC frame may be additionally added to the status PDU)

4) an ACK_SN field including a frame number of an RLC frame having the smallest frame number (FN) among the RLC frames for which reception failure information corresponding to 1) to 3) is not included in the status PDU although not completely received (a portion or all is not received) is included in the status PDU The transmitting device may trigger status reporting from the receiving device by setting the value of the polling bit field (P field) to '1' in the ARQ PDU. Specifically, when an RLC SDU set comprised of an RLC SDU or a portion of the RLC SDU that has never been transmitted before is included in an RLC frame to be transmitted by the transmitting device, the transmitting device may manage counters of the transmitting device as in the following procedure and set a value of the polling bit field (P field) of the ARQ PDU.

i. increase a counter FRAME_WITHOUT_POLL by 1 ii. increase a counter BYTE_WITHOUT_POLL by a byte size of the RLC SDU or a portion of the RLC SDU that is included in the RLC frame but has never been transmitted before iii. when the counter FRAME_WITHOUT_POLL>=parameter pollFRAME or the counter BYTE_WITHOUT_POLL>=parameter pollByte, the value of the polling bit field (P field) of the ARQ PDU is set to 1. Otherwise, the value of the polling bit field (P field) of the ARQ PDU is set to 0.

iv. In the case of setting the value of the polling bit field (P field) of the ARQ PDU to 1, values of the counter FRAME_WITHOUT_POLL and counter BYTE_WITHOUT_POLL are set to 0.

A state variable POLL_FN managed by the transmitting device may indicate a value of a frame number of the ARQ PDU with the polling bit field (P field) set to 1. Furthermore, when an RLC frame including an ARQ PDU having the polling bit field (P field) set to 1 is transmitted to a lower layer, the value of the state variable POLL_FN may be set to a frame number of the RLC frame in the RLC layer.

The transmitting device may use a t-PollRetransmit timer to manage retransmission of the poll. Specifically, when the transmitting device transmits an ARQ PDU with the value of the polling bit field (P field) set to 1 but the receiving device fails to receive the status PDU before expiration of the t-PollRetransmit timer, the transmitting device may retransmit the poll (i.e., set the value of the polling bit field (P field) of the ARQ PDU for next transmission back to 1).

When an RLC frame including an ARQ PDU having the value of the polling bit field (P field) set to 1 is sent to the MAC layer, the transmitting device starts the t-PollRetransmit timer when the t-PollRetransmit timer is not running, and restarts the t-PollRetransmit timer when the t-PollRetransmit timer is already running.

The t-PollRetransmit timer may be stopped and reset when the status PDU having information about whether the RLC frame corresponding to the state variable POLL_FN is received is received. When the t-PollRetransmit timer is expired, the value of the polling bit field (P field) of the ARQ PDU to be transmitted next may be set back to 1.

The transmitting device may perform the following operation upon receiving information of the status PDU indicating that at least a portion of the RLC frame has not been received.

state variable TX_Next_Ack_f<=frame number (FN) corresponding to reception failure information<="the largest of frame numbers of RLC frames previously sent to the MAC layer" is satisfied, an RLC frame or at least a portion of the RLC frame corresponding to the reception failure information may be retransmitted.

Furthermore, when the number of retransmissions of the RLC frame exceeds a certain number of times (which means that a condition of the link between the transmitting device and the receiving device becomes worse), the transmitting device informs this to a higher layer to manage the link between the transmitting device and the receiving device.

Referring to FIG. 9B, segmentation handling 914 may be performed only when segmentation occurs, and needs to be performed for the respective RLC data PDUs as in FIG. 8B. Specifically, segmentation handling 914 may include operations of storing the segmented RLC SDU, concatenating those of portions of the received RLC SDU having the same sequence number, and concatenating the portions of the RLC SDU having the same sequence number to generate the complete RLC SDU if possible. In other words, as segmentation occurs on a certain RLC SDU in the RLC frame, the segmentation handling 914 may be performed in processing an RLC data PDU including a certain RLC SDU, the sequence number, and segmentation information of the RLC SDU. That is, the segmentation handling 914 may be performed on a sequence number basis.

FIG. 9C is a diagram for describing ARQ PDU based RLC operations, according to an embodiment of the disclosure.

Referring to 921 of FIG. 9C, to process operations related to RLC data PDUs, operations of updating the state variable on the frame number basis, handling the t-Reassembly, and generating the status PDU may be performed. The overlapping part of FIG. 9C with FIG. 9B will not be described again, but only a part different from FIG. 9B will be described.

Referring to FIG. 9C, the receiving device may determine RLC frames to be discarded based on the frame number of at least one ARQ PDU, and discard the RLC frames. Referring to 921 of FIG. 9C, not only the ARQ related operation but also the packet discarding operation may be performed based on the ARQ PDU.

The receiving device may pre-process the RLC frame based on information included in the ARQ PDU to further reduce operations for the respective RLC data PDUs. Specifically, referring to FIG. 9C, the receiving device may determine whether the frame number of the RLC frame is within a receiving window. More specifically, when the frame number satisfies state variable RX_Next_f<=frame number (FN)<state variable RX_Next_f+receiving window size RX_Window_Size, it is determined to be within the receiving window, and accordingly, an RLC frame corresponding to the frame number is not discarded. On the other hand, when the frame number does not satisfy the expression, the RLC frame corresponding to the frame number is discarded, and accordingly, RLC data PDUs included in the RLC frame may be discarded. As the packet discarding operation is performed on an RLC frame basis in processing the ARQ PDU, operations for receiving window handling on a sequence number basis, handling of state variables RX_Next_s_data and RX_Next_s_ARQ, and determining whether a sequence number of each RLC data PDU is included in the receiving window may be omitted among operations to be processed upon reception of RLC data PDU. That is, processing operations for RLC data PDU may be reduced.

FIG. 9B differs from FIG. 9C where the operation 921 related to packet discarding is performed on the frame number basis, in that the operation 912 related to packet discarding is performed based on the sequence number included in the ARQ PDU and the sequence number included in the RLC header of the RLC data PDU.

Furthermore, the receiving device may determine whether at least a portion of the RLC data PDU set is redundantly received, based on the frame number included in the at least one ARQ PDU and segmentation information on the at least a portion of the RLC data PDU set, and discard the RLC data PDU set or the segmented RLC data PDU set determined as being redundantly received. In other words, when determining that an RLC data PDU set or a segmented RLC data PDU set (when segmented) has been redundantly received, the receiving device may also discard the RLC data PDU set or the segmented RLC data PDU set.

In another embodiment of the disclosure, when packet discarding is performed in the PDCP layer or the MAC layer instead, the operation related to packet discarding may not be performed in the RLC layer.

Figure 10A:
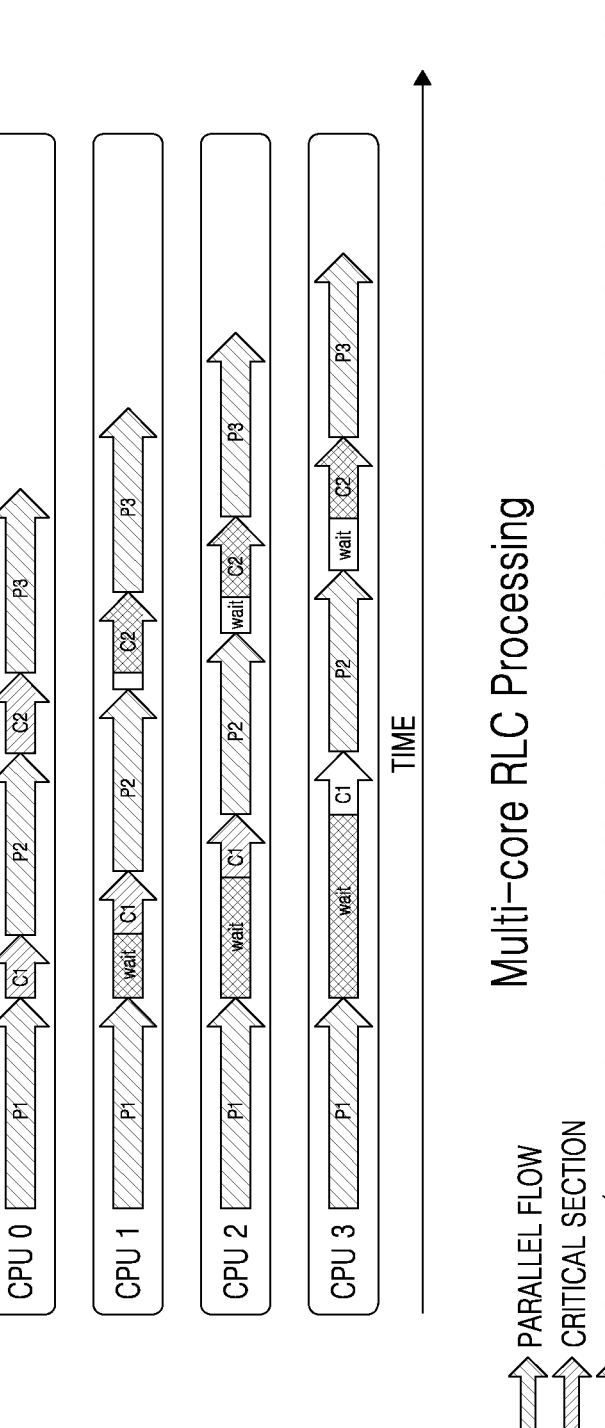
FIG. 10A is a diagram for describing processing of an RLC operation in a multi-core environment, according to an embodiment of the disclosure.

FIG. 10A is a diagram for describing processing of an RLC operation in a multi-core environment, according to an embodiment of the disclosure.

Referring to FIG. 10A, an RLC operation may be processed in a multi-core environment. To support ultrahigh transmission, there may be a need to process packets on a basis of a multi-core based parallel structure. In the multi-core environment, however, the multi-core performance may deteriorate due to an operation of each core having to access a shared resource, i.e., critical section Hence, a method for minimizing the critical section is required, and the aforementioned method of FIG. 9B may be efficient for multi-core.

Referring to FIG. 10A, CPU 0 to CPU 3 refer to difference cores. The plurality of cores CPU 0 to CPU 3 may perform RLC operations in parallel (parallel flow). To perform a certain RLC operation, the plurality of cores CPU 0 to CPU 3 may need to access a shared resource. For the aforementioned RLC operations, the state variables, the timer, the RCL frame receiving condition, etc., are the shared resource to be accessed by multiple cores to process the RLC operation, and the operations to access the shared resource correspond to the critical section. For example, the ARQ related operation, the packet discarding related operation, the segmentation handling, etc., may be included in the critical section. Specifically, in FIGS. 8B, 9B and 9C, all the operations except for an operation of sending a packet to the PDCP layer may be included in the critical section.

When an access of the plurality of cores CPU 0 to CPU 3 to the shared resource is made in the critical section, the other cores CPU 1 to CPU 3 are unable to use a shared resource while the first core CPU 0 is using the shared resource. That is, the section may be one in which a busy wait (a wait for using the shared resource) occurs. When the busy wait section ends, one of the other cores CPU 1 to CPU 3 may use the shared resource.

That is, there are shared resources in the multi-core environment, and simultaneous use of the shared resources may be difficult in the critical section. In this case, as described with reference to FIGS. 9B and 9C, a portion of the critical section may be efficiently processed. Specifically, referring to FIGS. 9B and 9C, by separating a resource to be accessed to process the ARQ PDU from a resource to be accessed to process the RLC data PDU to be not shared, the critical section may be reduced for the operation of processing the ARQ PDU or the RLC data PDU.

Figure 10B:
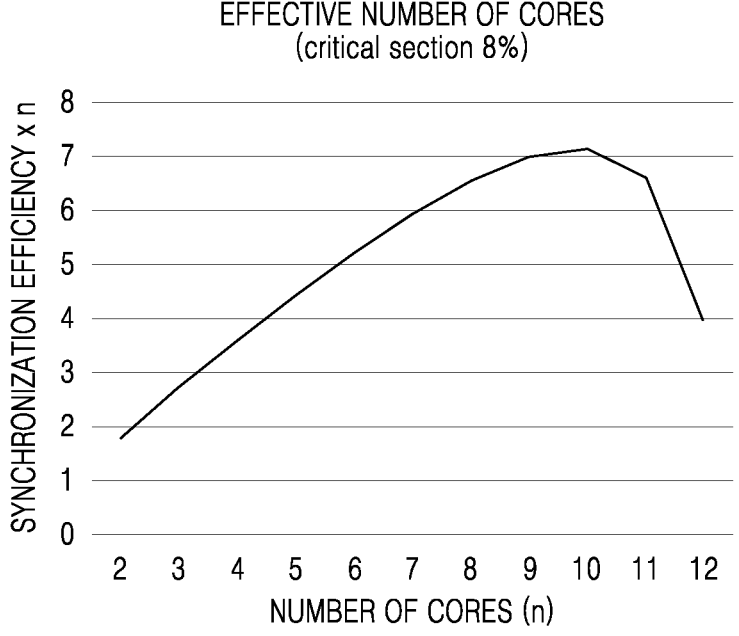
FIG. 10B is a diagram for describing efficiency of an RLC operation in a multi-core environment, according to an embodiment of the disclosure.

FIG. 10B is a diagram for describing efficiency of an RLC operation in a multi-core environment, according to an embodiment of the disclosure.

FIG. 10B is a graph for describing influences given by the critical section on synchronization efficiency depending on the number of cores. Specifically, for 8% of critical section, multi-core performance may increase until the number of cores reaches a certain number and then decrease. Specifically, the synchronization efficiency may increase until the number of cores reaches 10 and then decrease. In other words, due to the critical section, a section in which efficiency increases, that may be caused by the use of multiple cores, may be limited to a section of less than a certain number of cores.

Figure 11:
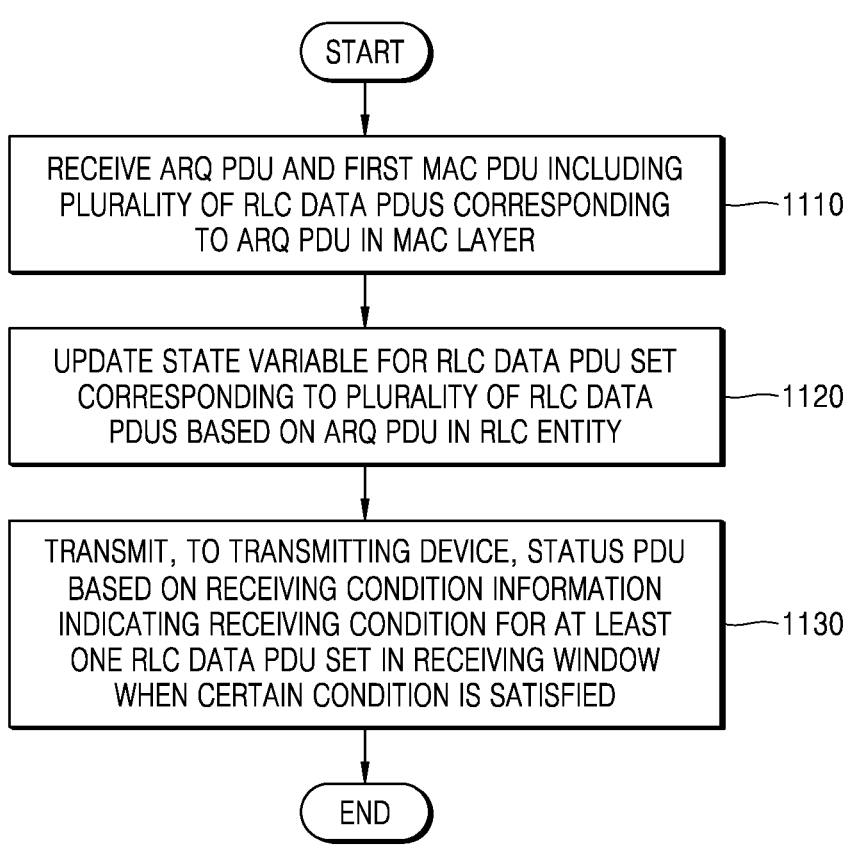
FIG. 11 is a flowchart for describing operations of a receiving device, according to an embodiment of the disclosure.

FIG. 11 is a flowchart for describing operations of a receiving device, according to an embodiment of the disclosure.

In operation 1110, the receiving device may receive an ARQ PDU and a first MAC PDU including a plurality of RLC data PDUs corresponding to the ARQ PDU in the MAC layer. In this case, the ARQ PDU may include information for processing an RLC operation related to the plurality of RLC data PDUs. Specifically, the ARQ PDU may include identification information for the RLC data PDUs corresponding to the ARQ PDU.

In operation 1120, the receiving device may update state variables for an RLC data PDU set corresponding to a plurality of RLC data PDUs based on the ARQ PDU in the RLC entity. For example, the receiving device may process the RLC data PDU set based on information included in the ARQ PDU. Details of updating the state variables based on the ARQ PDU on a frame number or sequence number basis are described above in connection with FIGS. 9B and 9C, and will thus not be repeated.

In operation 1130, the receiving device may transmit, to the transmitting device, a status PDU generated based on receiving condition information indicating a receiving condition for at least one RLC data PDU set in a receiving window and the updated state variable, when a certain condition is satisfied. Specifically, the receiving device may generate and transmit a status PDU upon detection of a reception failure of the whole or at least a portion of an RLC frame through handling of a state variable and handling of the t-Reassembly timer. Detailed operations for generating a status PDU are the same as what are described above, so the description thereof will not be repeated.

Figure 12:
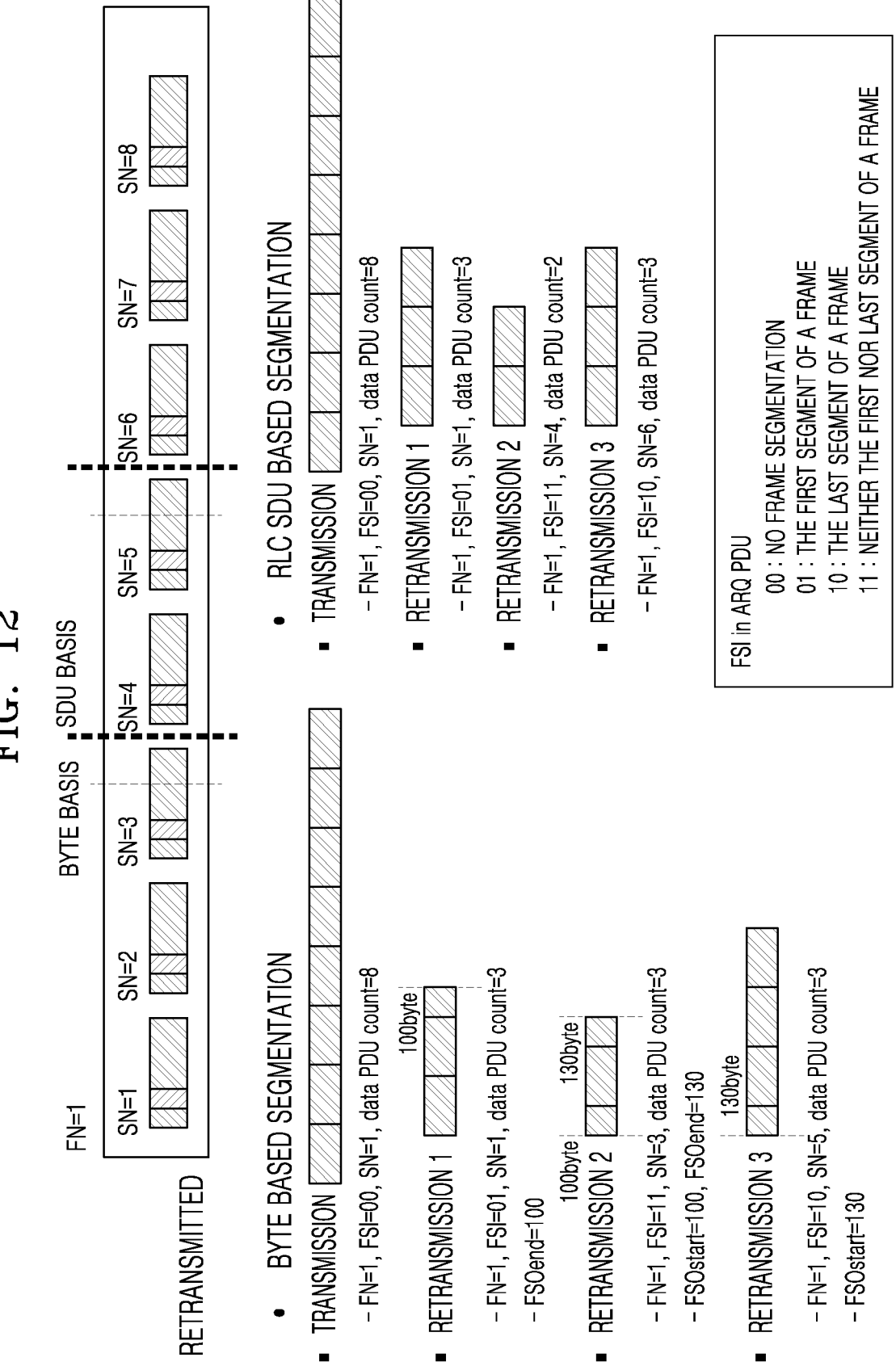
FIG. 12 is a diagram for describing a method of handling segmentation in RLC frame retransmission, according to an embodiment of the disclosure.

FIG. 12 is a diagram for describing a method of processing segmentation in RLC frame retransmission, according to an embodiment of the disclosure.

As described above, in the initial transmission, segmentation occurs only on RLC SDUs and not on the RLC data PDU set itself for initial transmission. In a case of retransmitting the initial RLC data PDU set, the RLC data PDU set for retransmission may be the segmented initial RLC data PDU set, and the segmentation may be performed on a byte basis or RLC SDU basis. Although the expression 'the segmentation of an RLC frame or an RLC data PDU set' is used for convenience of explanation, it refers to segmentation on RLC SDUs in the RLC frame as the target for segmentation is the RLC SDU. The RLC header may not be a target for segmentation, and only the size of the RLC header may change by segmentation.

Referring to FIG. 12, RLC SDUs included in the RLC data PDU set for retransmission may be segmented on a byte basis or RLC SDU basis based on a resource allocation. Information included in the ARQ PDU when the RLC data PDU set is segmented on the byte basis or RLC SDU basis will now be described in connection with FIG. 12. The receiving device may determine whether the RLC data PDU set is segmented based on the ARQ PDU included in the received MAC PDU. The ARQ PDU included in the MAC PDU may include information about the segmentation of the segmented RLC frame, and the information about the segmentation may include at least one of information about whether segmentation is made, information about a unit of segmentation, information about a location of the segmentation, a starting point of the segmentation, an ending point of the segmentation, or information about an offset of the segmentation.

The ARQ PDU may include a frame segmentation information (FSI). The FSI may indicate information about whether no segmentation occurs in the RLC frame (i.e., the whole frame), whether segmentation occurs in the first portion of the RLC frame, whether segmentation occurs in the last portion of the RLC frame, or whether segmentation occurs in the middle of the RLC frame (i.e., segmentation occurs in the RLC frame except for the first portion or the last portion). As described above, a target for RLC frame segmentation is RLC SDUs, so the RLC frame segmentation or RLC data PDU set segmentation refers to segmentation on RLC SDUs or a portion of the RLC SDU in the RLC frame. Specifically, segmentation of the RLC frame being in the first portion means that segmentation occurs to include the first portion of RLC SDUs included in the RLC data PDU set of the RLC frame or part of the RLC SDU.

For example, the FSI may be represented in 2 bits: when the FSI is '00', it indicates that no segmentation occurs in the RLC frame, when the FSI is '01', it indicates that segmentation occurs to include the first portion of the RLC SDUs or part of the RLC SDU included in the RLC data PDU set of the RLC frame, when the FSI is '10', it indicates that segmentation occurs to include the last portion of the RLC SDUs or part of the RLC SDU included in the RLC data PDU set of the RLC frame, and when the FSI is '11', it indicates that segmentation occurs to include a middle portion rather than the first and last portions of the RLC SDUs or part of the RLC SDU included in the RLC data PDU set of the RLC frame. However, the information about the location of segmentation in the RLC frame may be included in the ARQ PDU in another method, and is not limited to the above example. Information included in an ARQ PDU in a case that an RLC data PDU set of an RLC frame is segmented on a byte basis or RLC SDU basis according to a resource allocation will now be described. In this case, a target for segmentation in the RLC frame (the ARQ PDU and the RLC data PDU set) is not the ARQ PDU but RLC SDUs or a portion of the RLC SDU included in the RLC data PDU set. In other words, segmentation of the RLC frame in the disclosure may refer to segmentation on RLC SDUs or part of the RLC SDU included in the RLC data PDU set, which will be expressed as segmentation of RLC frame for convenience of explanation.

<Case of Byte Based Segmentation>

As described above, on the occasion of initial transmission of an RLC data PDU set, the RLC data PDU set is determined according to a resource allocation, so there is no need to segment the RLC frame. Specifically, for the RLC frame to be initially transmitted, the FSI may be '00' (indicating that segmentation is not performed in the frame). In this case, the ARQ PDU may include an identification number corresponding to the ARQ PDU (frame number=1), frame segmentation information (FSI=00), an identification number for the first of RLC data PDUs corresponding to the ARQ PDU (SN=1), and the number of RLC data PDUs included in the RLC frame (data PDU count=8). Accordingly, based on the ARQ PDU, the receiving device may find that an RLC frame corresponding to the frame number 1 is received, no segmentation occurs in the received RLC frame, the RLC frame includes an RLC data PDU corresponding to the sequence number 1 as the first RLC data PDU, and the received RLC frame includes RLC data PDUs of up to sequence number 8.

According to the resource allocation, an RLC frame for retransmission may be segmented into certain portions. In FIG. 12, assume that segmentation occurs twice in the RLC frame. Specifically, assume that, according to the resource allocation, the first segment of the segmented RLC frame is transmitted in the first retransmission (retransmission 1), a middle segment of the segmented RLC frame is transmitted in the second retransmission (retransmission 2), the last segment of the segmented RLC frame is transmitted in the third retransmission (retransmission 3).

For the first segment of the segmented RLC frame, the ARQ PDU may include an identification number corresponding to the ARQ PDU (frame number=1), frame segmentation information (FSI=01), an identification number for an RLC data PDU where the segmentation starts among the RLC data PDUs corresponding to the ARQ PDU (SN=1), the number of different RLC data PDUs included in the first segment of the segmented RLC frame (data PDU count=3) and frame segmentation offset information (FSOend=100). The frame segmentation offset (FSO) information may include a parameter indicating a starting point at which segmentation occurs in an RLC SDU set in which RLC SDUs (portions excluding RLC headers from RLC data PDUs) included in the RLC data PDU set are concatenated in sequence (FSOstart), and a parameter indicating an ending point of the segmentation in an RLC SDU set in which RLC SDUs (portions excluding RLC headers from RLC data PDUs) included in an RLC data PDU set are concatenated in sequence (FSOend). The starting point in the first segment of the segmented RLC frame is always the very beginning of the RLC frame, so the ARQ PDU may not include the parameter indicating the starting point of the segmentation (FSOstart). In other words, the first segment of the segmented RLC frame includes the beginning portion of the RLC SDU set, so the ARQ PDU may not include the parameter FSOstart but include the ending point of the segmentation (FSOend).

Based on the ARQ PDU, the receiving device may find that a segment of an RLC frame corresponding to the frame number 1 is received, the segment of the RLC frame corresponds to the first segment of the segmented RLC frame, and the first segment of the segmented RLC frame includes the RLC data PDU corresponding to the sequence number 1 as the first RLC data PDU and three different RLC data PDUs. Accordingly, based on the data PDU count being 3, the receiving device may find that the first segment of the segmented RLC frame includes the RLC data PDU corresponding to the sequence number 1 to at least a portion of the third RLC data PDU (corresponding to the sequence number 3). The receiving device may also find that segmentation occurs at a point 100 bytes away from the starting point of the RLC SDU set, based on a value of the parameter FSOend being 100.

For the middle segment of the segmented RLC frame, the ARQ PDU may include an identification number corresponding to the ARQ PDU (frame number=1), frame segmentation information (FSI=11), an identification number for an RLC data PDU where the segmentation starts among the RLC data PDUs corresponding to the ARQ PDU (SN=3), the number of different RLC data PDUs included in the middle segment of the segmented RLC frame (data PDU count=3) and the frame segmentation offset information (FSOstart=100 and FSOend=130). For a segment that is not the first or last segment, information about both the starting point of the segmentation and the ending point of the segmentation is required. Hence, for a middle segment of the segmented RLC frame, the ARQ PDU needs to include the parameter FSOstart and the parameter FSOend.

Based on the ARQ PDU, the receiving device may find that a segment of an RLC frame corresponding to the frame number 1 is received, the segment of the RLC frame corresponds to a middle segment of the segmented RLC frame, and the middle segment of the segmented RLC frame includes the RLC data PDU corresponding to the sequence number 3 as the first RLC data PDU and three different RLC data PDUs. Furthermore, based on the data PDU count being 3, the receiving device may find that the middle segment of the segmented RLC frame from the RLC data PDU corresponding to the sequence number 3 to the third RLC data PDU (corresponding to the sequence number 5) is received. The receiving device may also find that the segmentation starts at a point 100 bytes away from the starting point of the RLC SDU set, based on a value of the parameter FSOstart being 100. The receiving device may also find that the segmentation ends at a point 130 bytes away from the starting point of the RLC SDU set, based on a value of the parameter FSOend being 130.

Furthermore, for the last segment of the segmented RLC frame, the ARQ PDU may include an identification number corresponding to the ARQ PDU (frame number=1), frame segmentation information (FSI=10), an identification number for an RLC data PDU where the segmentation starts among the RLC data PDUs corresponding to the ARQ PDU (SN=5), the number of different RLC data PDUs included in the last segment of the segmented RLC frame (data PDU count=4) and frame segmentation offset information (FSOstart=130). As the last segment of the segmented RLC frame needs to include up to the ending portion of the RLC frame, only the information about the starting point of the segmentation is required. The ending point in the last segment of the segmented RLC frame is always the last of the RLC frame, so the ARQ PDU may not include the parameter indicating the ending point of the segmentation (FSOend). In other words, the last segment of the segmented RLC frame always includes the last portion of the RLC SDU set, so the ARQ PDU may not include the parameter FSOend but include the starting point of the segmentation (FSOstart).

Based on the ARQ PDU, the receiving device may find that a segment of an RLC frame corresponding to the frame number 1 is received, the segment of the RLC frame corresponds to the last segment of the segmented RLC frame, and the last segment of the segmented RLC frame includes the RLC PDU corresponding to the sequence number 5 as the first RLC data PDU and four different RLC data PDUs. Furthermore, based on the data PDU count being 4, the receiving device may find that the last segment of the segmented RLC frame from the RLC data PDU corresponding to the sequence number 5 to the fourth RLC data PDU (corresponding to the sequence number 8) is received. The receiving device may also find that the segmentation starts at a point 130 bytes away from the starting point of the RLC SDU set, based on a value of the parameter FSOstart being 130. Furthermore, the last segment of the segmented RLC frame may include the starting point to the end of an RLC SDU set corresponding to sequence number 8.

<Case of SDU Based Segmentation>

In a case that an RLC frame (as described above, segmentation occurs in an RLC SDU set) is segmented on an SDU basis, unlike the aforementioned byte based segmentation, there is no need for the ARQ PDU to include FSO information. In other words, when an RLC SDU set is segmented on the RLC SDU basis, segmentation does not occur in an RLC SDU, so the ARQ PDU is not required to include the FSO information. Accordingly, in the case of RLC SDU based segmentation, information included in the ARQ PDU may be simplified, which will be described later.

As described above, on the occasion of initial transmission of an RLC data PDU set, the RLC data PDU set is determined to match a resource allocation, so there is no need to segment the RLC RLC data PDU set. Specifically, for the RLC frame to be initially transmitted, the FSI may be '00' (indicating that segmentation is not performed in the RLC frame). In this case, the ARQ PDU may include an identification number corresponding to the ARQ PDU (frame number=1), frame segmentation information (FSI=00), an identification number for the first of RLC data PDUs corresponding to the ARQ PDU (SN=1), and a total number of RLC data PDUs (data PDU count=8). Accordingly, based on the ARQ PDU, the receiving device may find that an RLC frame corresponding to the frame number 1 is received, no segmentation occurs in the received RLC frame, the RLC frame includes an RLC data PDU corresponding to the sequence number 1 as the first RLC data PDU, and the received RLC frame includes RLC data PDUs of up to sequence number 8.

For the first segment of the segmented RLC frame, the ARQ PDU may include an identification number corresponding to the ARQ PDU (frame number=1), frame segmentation information (FSI=01), an identification number for an RLC data PDU where the segmentation starts among the RLC data PDUs corresponding to the ARQ PDU (SN=1), and the number of different RLC data PDUs included in the first segment of the segmented RLC frame (data PDU count=3).

Based on the ARQ PDU, the receiving device may find that a segment of an RLC frame corresponding to the frame number 1 is received, the segment of the RLC frame corresponds to the first segment of the segmented RLC frame, and the first segment of the segmented RLC frame includes the RLC data PDU corresponding to the sequence number 1 as the first RLC data PDU and three different RLC data PDUs. In other words, the receiving device may find that the first segment of the segmented RLC frame includes RLC data PDUs corresponding to sequence numbers 1 to 3.

For the middle segment of the segmented RLC frame, the ARQ PDU may include an identification number corresponding to the ARQ PDU (frame number=1), frame segmentation information (FSI=11), the identification number for an RLC data PDU where the segmentation starts among the RLC data PDUs corresponding to the ARQ PDU (SN=4), and the number of different RLC data PDUs included in the middle segment of the segmented frame (data PDU count=2).

Based on the ARQ PDU, the receiving device may find that a segment of an RLC frame corresponding to the frame number 1 is received, the segment of the RLC frame corresponds to a middle segment of the frame, and the middle segment of the segmented RLC frame includes the RLC data PDU corresponding to the sequence number 4 as the first RLC data PDU and two different RLC data PDUs. In other words, the receiving device may find that the middle segment of the segmented RLC frame includes RLC data PDUs corresponding to sequence numbers 4 and 5.

Furthermore, for the last segment of the segmented RLC frame, the ARQ PDU may include an identification number corresponding to the ARQ PDU (frame number=1), frame segmentation information (FSI=10), an identification number for an RLC data PDU where the segmentation starts among the RLC data PDUs corresponding to the ARQ PDU (SN=6), and the number of different RLC data PDUs included in the last segment of the segmented RLC frame (data PDU count=3).

Based on the ARQ PDU, the receiving device may find that a segment of an RLC corresponding to the frame number 1 is received, the segment of the RLC frame corresponds to the last segment of the frame, and the last segment of the segmented RLC frame includes the RLC data PDU corresponding to the sequence number 5 as the first RLC data PDU and four different RLC data PDUs. In other words, the receiving device may find that the last segment of the segmented RLC frame includes RLC data PDUs corresponding to sequence numbers 6 to 8.

In the case that an RLC frame is segmented on the RLC SDU basis, the ARQ PDU may include only identification information of the RLC frame, information about a starting point of the segmentation, and information about the number of RLC data PDUs included in the segmented RLC frame. Alternatively, information about an ending point of the segmentation may be included instead of the number of RLC data PDUs included in the segmented RLC frame. As such, information included in the ARQ PDU is not limited to the aforementioned embodiments, and may include anything about the segmentation.

Figure 13A:
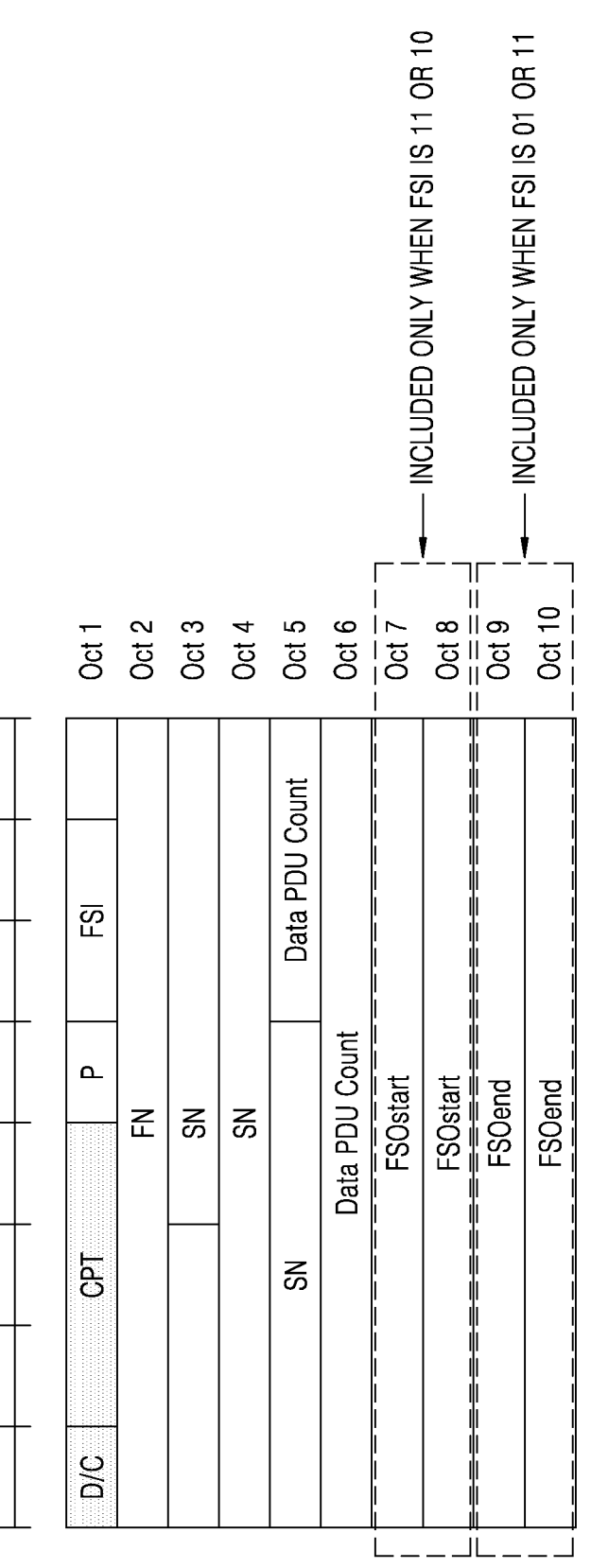
FIG. 13A illustrates a structure of an ARQ PDU in a case that an RLC frame is segmented on a byte basis, according to an embodiment of the disclosure.

FIG. 13A illustrates a structure of an ARQ PDU in a case that an RLC frame is segmented on a byte basis, according to an embodiment of the disclosure.

Referring to FIG. 13A, in a case that an RLC frame is segmented on a byte basis, the ARQ PDU may include at least one of frame identification information (FN) corresponding to the ARQ PDU, frame segmentation information (FSI), information about RLC data PDUs corresponding to the ARQ PDU (SN), information about the number of different RLC data PDUs corresponding to the ARQ PDU (data PDU count), and FSO information.

The FSO information may include a parameter indicating a starting point at which segmentation occurs in an RLC SDU set in which RLC SDUs (portions excluding RLC headers from RLC data PDUs) included in the RLC data PDU set are concatenated in sequence (FSOstart), and a parameter indicating an ending point of the segmentation in an RLC SDU set in which RLC SDUs (portions excluding RLC headers from RLC data PDUs) included in an RLC data PDU set are concatenated in sequence (FSOend). In the first segment of the segmented RLC frame, the starting point of the segmentation is always the very beginning of the RLC SDU set included in the RLC frame, so the ARQ PDU may not include the parameter indicating the starting point of the segmentation (FSOstart). In the last segment of the segmented RLC frame, the ending point of the segmentation is always the last of the RLC SDU set included in the RLC frame, so the ARQ PDU may not include the parameter indicating the ending point of the segmentation (FSOend). Also, in a case that no segmentation occurs, the parameter indicating the starting point of the segmentation (FSOstart) and the parameter indicating the ending point of the segmentation (FSOend) may not be included.

In other words, the ARQ PDU corresponding to the middle segment or the last segment of the segmented RLC frame may include the parameter FSOstart. Furthermore, the ARQ PDU corresponding to the middle segment or the middle segment of the segmented RLC frame may include the parameter FSOend indicating the ending point of the segmentation.

Figure 13B:
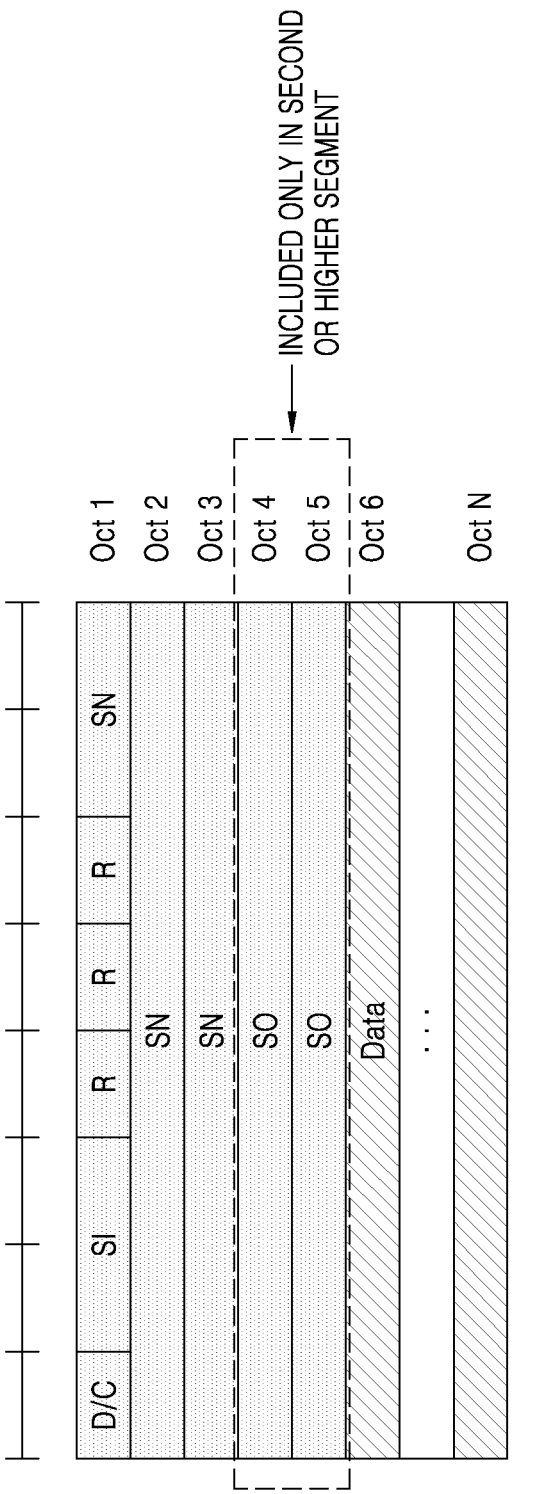
FIG. 13B illustrates a structure of an RLC data PDU in a case that an RLC frame is segmented on a byte basis, according to an embodiment of the disclosure.

FIG. 13B illustrates a structure of an RLC data PDU in a case that an RLC frame is segmented on a byte basis, according to an embodiment of the disclosure.

In a case that an RLC frame is segmented on a byte basis, segmentation may be performed in an RLC SDU included in the RLC frame. Hence, when segmentation occurs in an RLC SDU, the RLC header may include segmentation offset (SO) information indicating information about a segmentation location in the RLC SDU. Furthermore, the SO information may be included only in the second or higher segmentation. The first segment of the segmented RLC frame may start from a point of byte 0 of an RLC SDU set in the RLC frame, and the receiving device may find up to which byte the segmentation occurs based on a length field in an MAC subheader concatenated with the RLC header. On the other hand, when a whole RLC SDU is received, the RLC header may not include the SO information.

Figure 14:
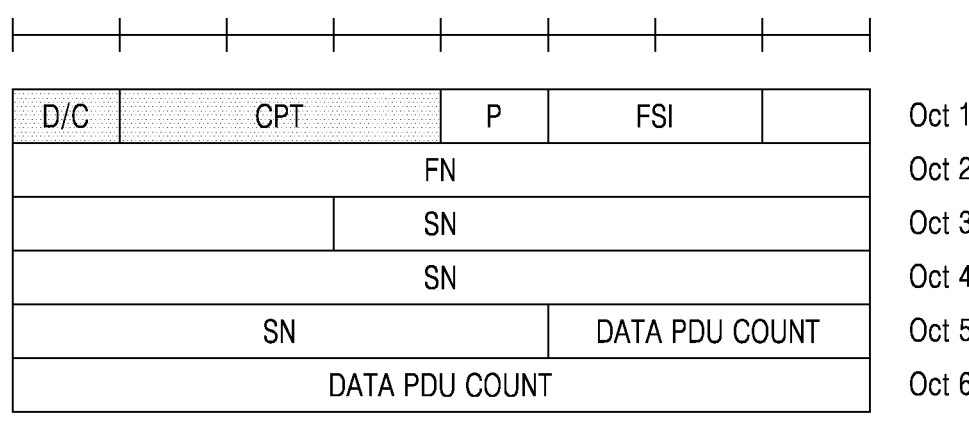
FIG. 14 illustrates structures of an ARQ PDU and an RLC data PDU in a case that an RLC frame is segmented on an RLC SDU basis, according to an embodiment of the disclosure.
Figure 14:
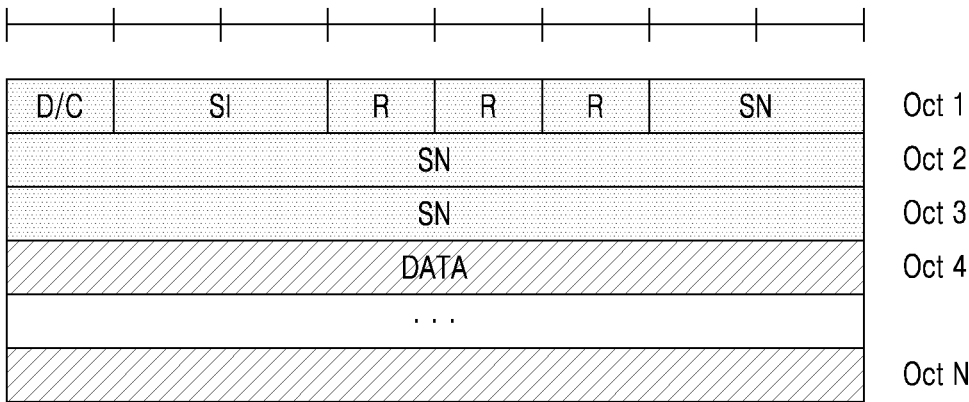

FIG. 14 illustrates structures of an ARQ PDU and an RLC data PDU in a case that an RLC frame is segmented on an RLC SDU basis, according to an embodiment of the disclosure.

Specifically, referring to FIG. 14, the receiving device may perform packet discarding on a sequence number basis as in the aforementioned FIG. 9B. Furthermore, when segmentation is performed on the RLC SDU basis, the ARQ PDU may not need to include information for segmentation handling.

Referring to FIG. 14, in a case that an RLC frame is segmented on the RLC SDU basis, the ARQ PDU may include at least one of frame identification information (FN), frame segmentation information (FSI), information about RLC data PDUs corresponding to the ARQ PDU (SN), or information about the number of different RLC data PDUs corresponding to the ARQ PDU (data PDU count). In the case that an RLC frame is segmented on the RLC SDU basis, the ARQ PDU may include only identification information of the frame, information about a starting point of the segmentation, and information about the number of RLC data PDUs included in the segmented RLC frame.

Figure 15:
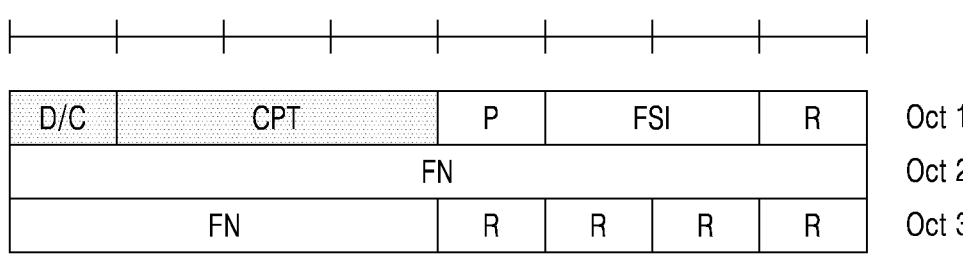
FIG. 15 illustrates structures of an ARQ PDU and an RLC data PDU in a case that an RLC frame is segmented on an RLC SDU basis, according to an embodiment of the disclosure.
Figure 15:
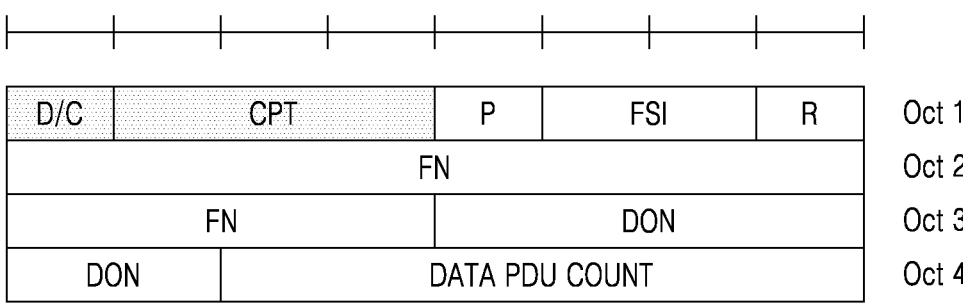
Figure 15:
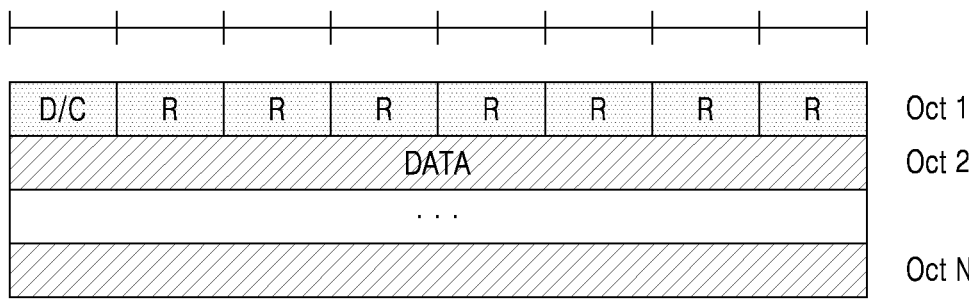

FIG. 15 illustrates structures of an ARQ PDU and an RLC data PDU in a case that an RLC frame is segmented on an RLC SDU basis, according to an embodiment of the disclosure.

Specifically, referring to FIG. 15, the receiving device may perform a packet discarding operation on a frame number basis as in the aforementioned FIG. 9C. As an operation related to packet discarding is performed on a frame number basis, ARQ PDU does not need to include information about the sequence number.

Referring to FIG. 15, when no segmentation occurs in the RLC frame (FSI=00), the ARQ PDU may include information about the frame number. Furthermore, when segmentation is performed in an RLC frame (FSI=01, 11 or 10), the ARQ PDU may include at least one of a frame number corresponding to the ARQ PDU, a data PDU ordering number (DON) corresponding to the ARQ PDU, or information about the number of different RLC data PDUs corresponding to the ARQ PDU (data PDU count).

Specifically, the DON refers to ordering the respective RLC data PDUs in the RLC frame from 1. Accordingly, in the first segment of the segmented RLC frame (FSI=01), as the starting point corresponds to the first RLC data PDU in the RLC frame, the ARQ PDU may include only the DON of an RLC data PDU corresponding to an ending point of the segmentation. Furthermore, in the last segment of the segmented RLC frame (FSI=10), as the ending point corresponds to the last RLC data PDU in the RLC frame, the ARQ PDU may include only the DON of an RLC data PDU corresponding to a starting point of the segmentation. Moreover, in a middle segment of the segmented RLC frame instead of the first segment of the segmented RLC frame or the last segment of the segmented RLC frame (FSI=11), an RLC data PDU corresponding to the starting point of the segmentation may be notified by the DON, and an offset from the starting point of the segmentation may be notified by the data PDU count. That is, the data PDU count may be included in the ARQ PDU only for a segment other than the first segment or the last segment of the segmented RLC frame.

The ARQ PDU and data PDU structures as described above in connection with FIGS. 13A to 15 are merely an example, and may have any forms that may inform the segmentation, without being limited to the above embodiments.

Figure 16A:
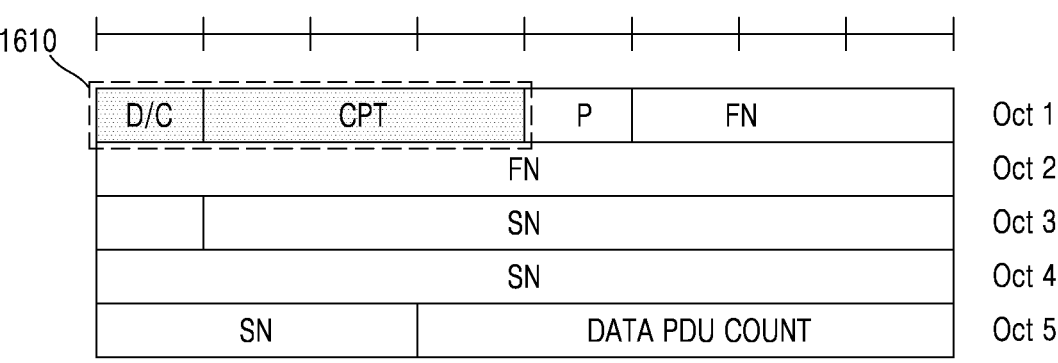
FIG. 16A illustrates a structure of an ARQ PDU, according to an embodiment of the disclosure.
Figure 16B:
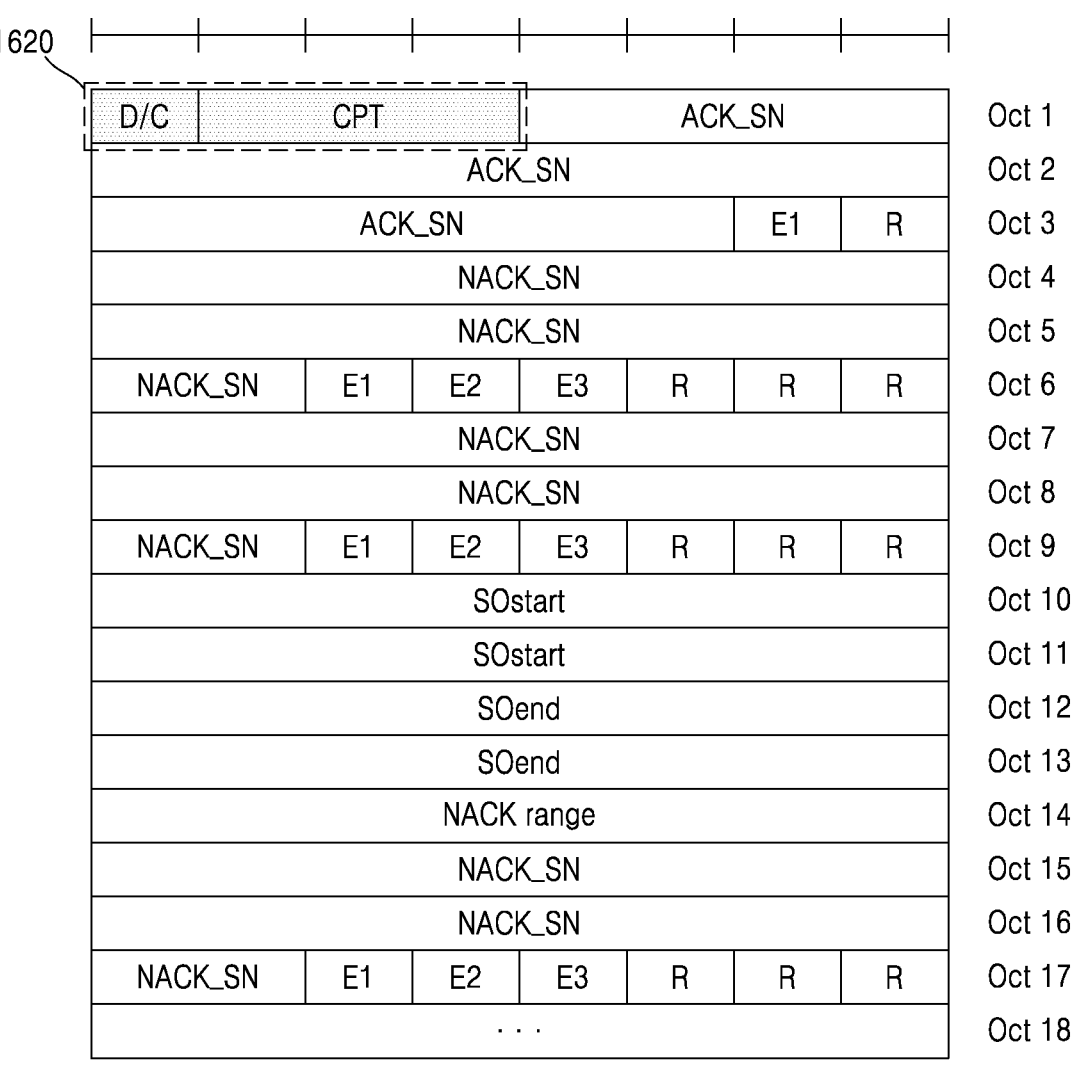
FIG. 16B illustrates a structure of a fifth generation (5G) status PDU, according to an embodiment of the disclosure.

FIG. 16A illustrates a structure of an ARQ PDU, according to an embodiment of the disclosure, and FIG. 16B illustrates a structure of a 5G status PDU, according to an embodiment of the disclosure.

Referring to FIGS. 16A and 16B, the structure of a header 1610 included in an ARQ PDU and the structure of a header 1620 of a 5G status PDU may be identical. In the case that the header 1620 of the 5G status PDU and the header 1610 of the ARQ PDU have the same structure, the receiving device may have an advantage of using the same structure of a hardware accelerator. It is advantageous for the UE in particular to be freed from additional implementations in the existing hardware accelerator structure.

Figure 17A:
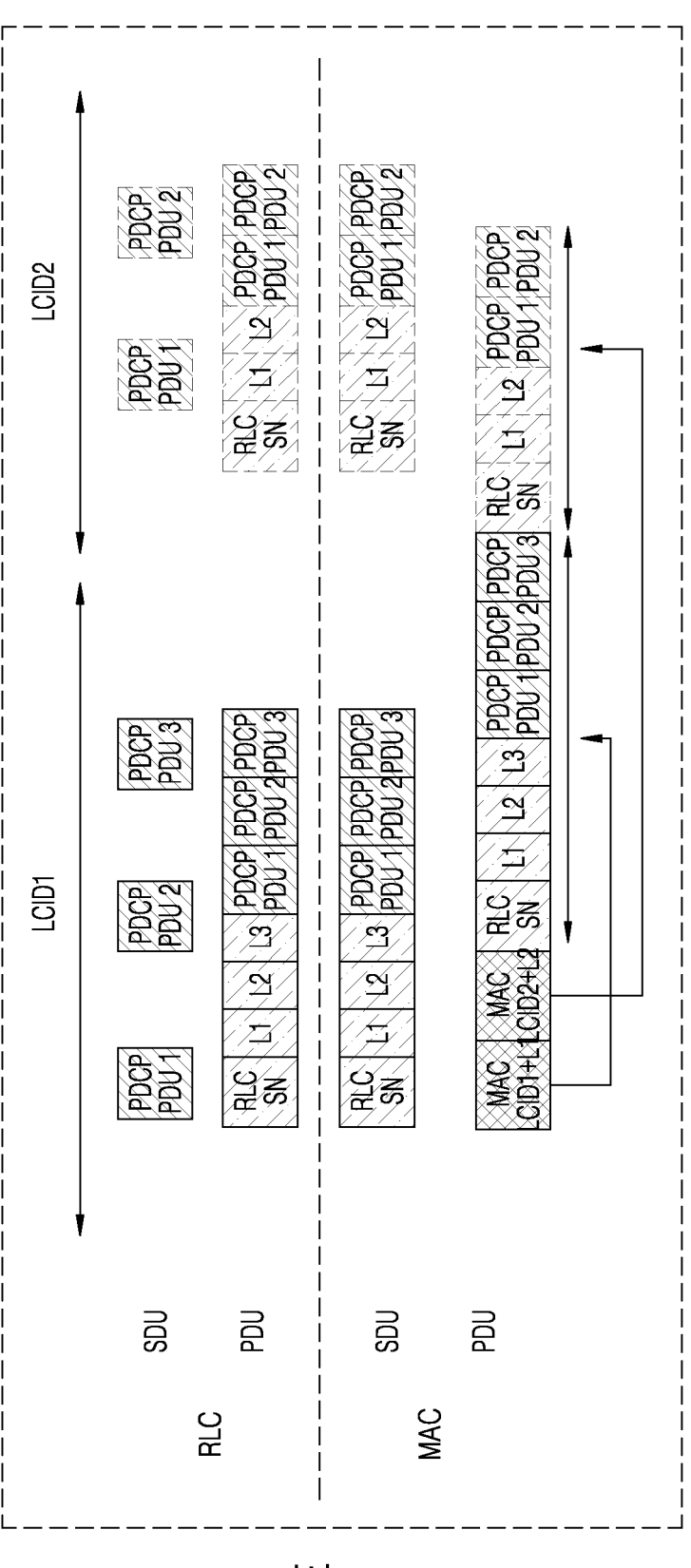
FIG. 17A is a diagram for describing packet processing in a long term evolution (LTE) system, according to an embodiment of the disclosure.
Figure 17B:
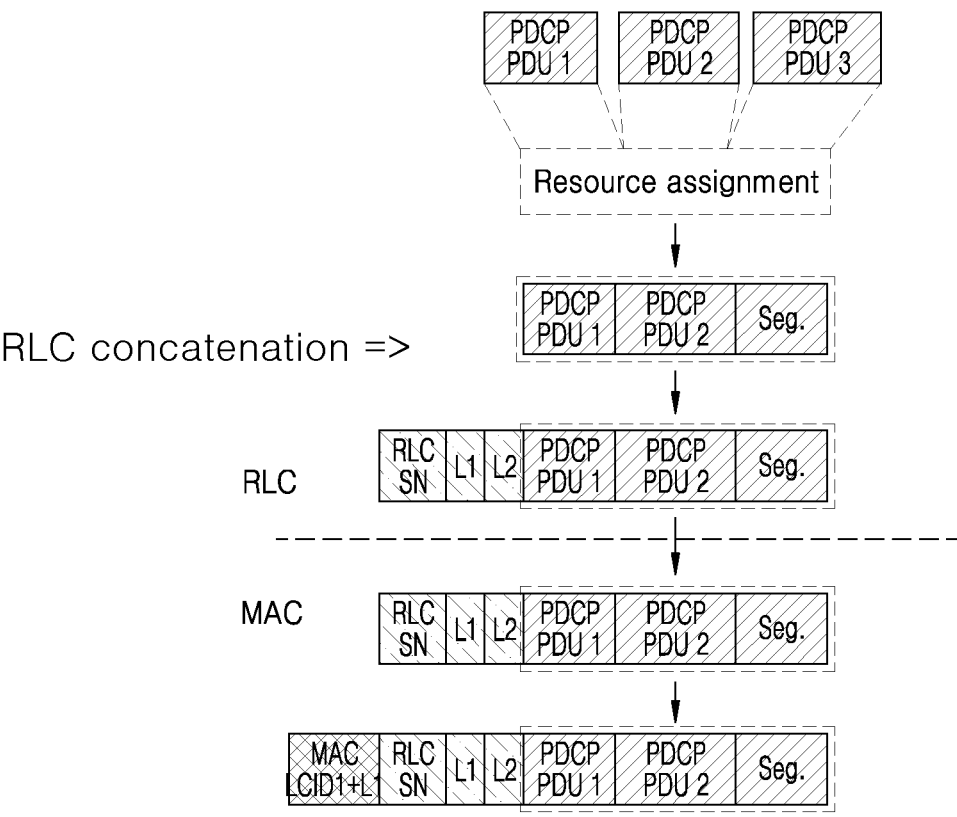
FIG. 17B is a diagram for describing a packet pre-processing procedure in an LTE system, according to an embodiment of the disclosure.

FIG. 17A is a diagram for describing packet processing in a long term evolution (LTE) system, according to an embodiment of the disclosure, and FIG. 17B is a diagram for describing a packet pre-processing procedure in an LTE system.

Referring to FIGS. 17A and 17B, in an LTE system, concatenation of PDCP PDUs may be performed in the RLC layer and one RLC header is added to the concatenated PDCP PDUs to generate one RLC PDU. Referring to FIG. 17B, pre-processing on the PDCP PDUs may be possible before uplink (UL) resource allocation. However, according to the LTE system, what may be pre-processed may be less as compared to the NR system because RLC concatenation may be handled after resource allocation and subsequent operations such as segmentation may also be handled after the resource allocation. Furthermore, the phenomenon of determining the RLC concatenation and subsequent operations after resource allocation may occur equally not only on UL but also DL.

Figure 17C:
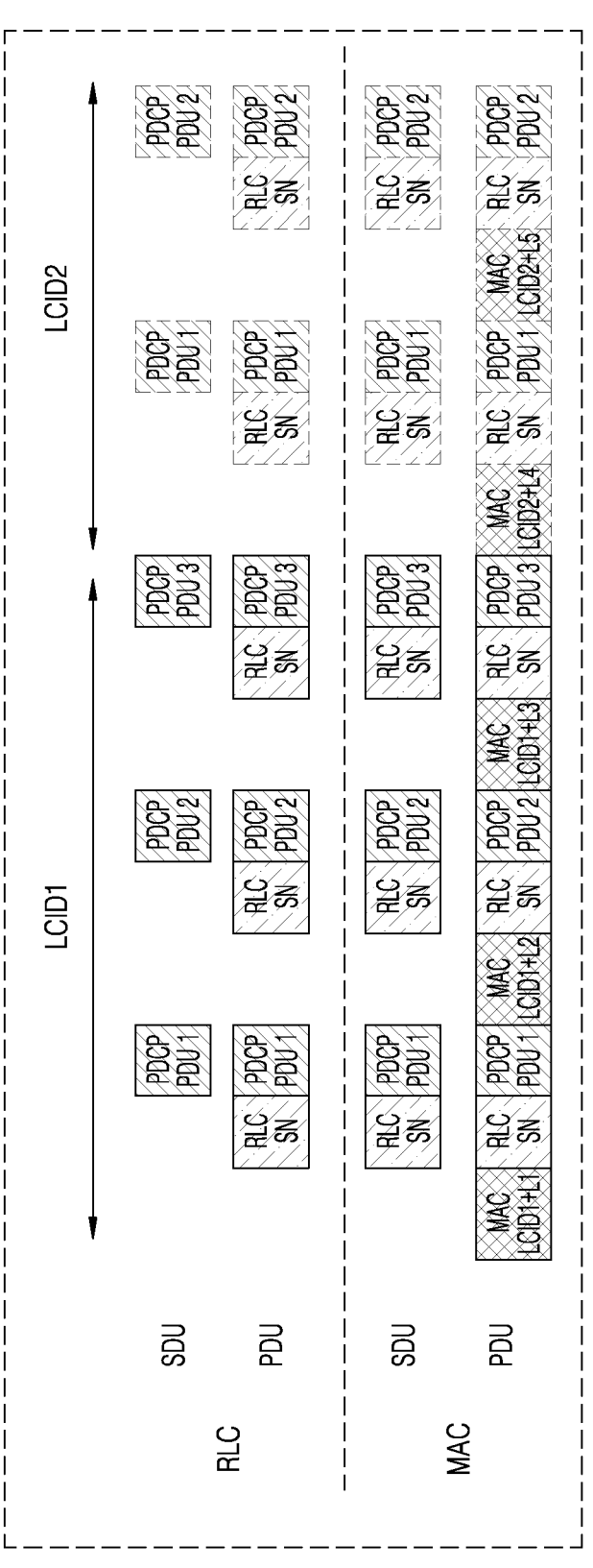
FIG. 17C is a diagram for describing packet processing in a new radio (NR) system, according to an embodiment of the disclosure.
Figure 17D:
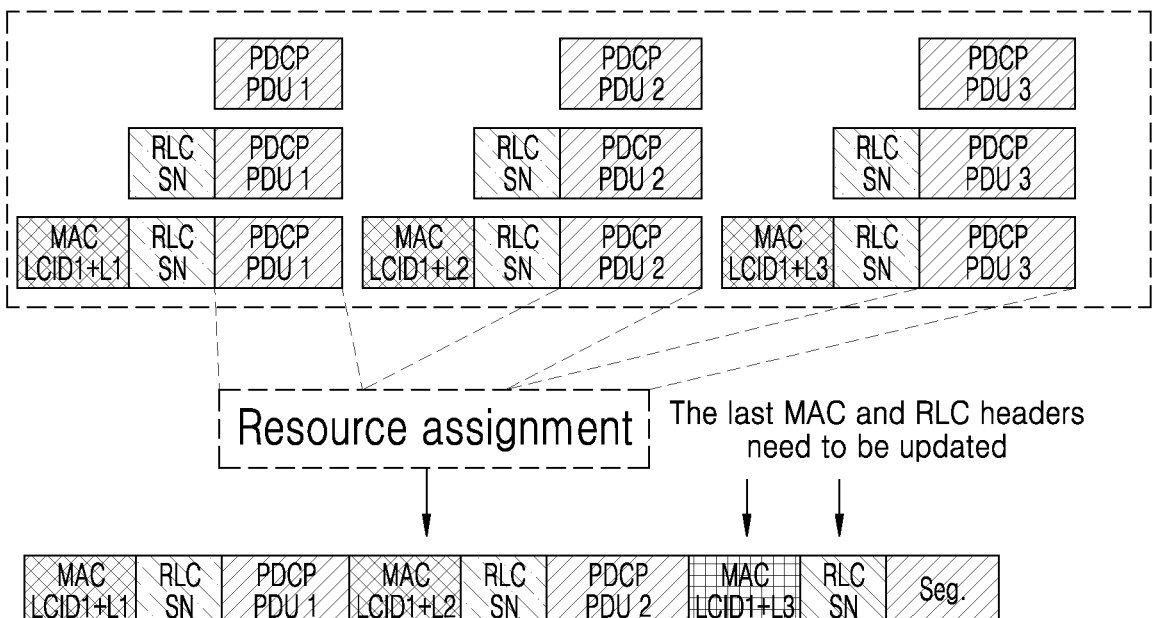
FIG. 17D is a diagram for describing a packet pre-processing procedure in an NR system, according to an embodiment of the disclosure.

FIG. 17C is a diagram for describing packet processing in a new radio (NR) system, according to an embodiment of the disclosure, and FIG. 17D is a diagram for describing a packet pre-processing procedure in an NR system.

Referring to FIGS. 17C and 17D, in an NR system, an operation based on a resource allocation (e.g., segmentation) may be performed after MAC sub PDUs are generated in the MAC layer. Referring to FIG. 17D, pre-processing on the RLC header and MAC subheaders may be performed before generation of the MAC PDU. Furthermore, when segmentation occurs based on a resource allocation, only the MAC subheader and RLC header corresponding to the last segment of the MAC PDU may be updated, so what may be pre-processed may be expanded as compared to the LTE system. According to an embodiment of the disclosure, as much pre-processing as in the NR system is possible. Specifically, for the ARQ PDU and the RLC data PDUs, pre-processing on the RLC header and the MAC subheader is possible. When segmentation occurs, information relating to the ARQ PDU and the RLC data PDU may be updated after resource allocation.

Figure 18:
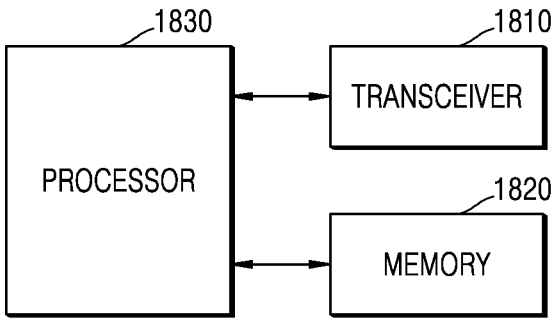
FIG. 18 illustrates a structure of a user equipment, according to an embodiment of the disclosure.

FIG. 18 illustrates a structure of a UE, according to an embodiment of the disclosure.

Referring to FIG. 18, the UE may include a transceiver 1810, a memory 1820, and a processor 1830. Components of the UE are not, however, limited thereto. For example, the UE may include more or fewer elements than described above. In addition, the transceiver 1810, the memory 1820, and the processor 1830 may be implemented in a single chip.

In an embodiment of the disclosure, the transceiver 1810 may transmit or receive signals to or from a BS. The aforementioned signals may include control information and data. For this, the transceiver 1810 may include an RF transmitter for up-converting the frequency of a signal to be transmitted and amplifying the signal and an RF receiver for low-noise amplifying a received signal and down-converting the frequency of the received signal. In addition, the transceiver 1810 may receive a signal on a wireless channel and output the signal to the processor 1820, or transmit a signal output from the processor 1820 on a wireless channel.

In an embodiment of the disclosure, the memory 1820 may store a program and data required for operation of the UE. Furthermore, the memory 1820 may store control information or data included in a signal transmitted or received by the UE. The memory 3502 may include a storage medium such as a read only memory (ROM), a random access memory (RAM), a hard disk, a compact disc ROM (CD-ROM), and a digital versatile disk (DVD), or a combination of storage mediums. Moreover, the memory 1820 may be in the plural.

In an embodiment of the disclosure, the processor 1830 may control a series of processes for the UE to be operated according to the above embodiments of the disclosure. For example, the processor 1830 may control ARQ related operations in the RLC layer, according to embodiments of the disclosure.

Specifically, the processor 1830 may control the respective components of the UE to obtain a plurality of RLC data PDUs in the RLC entity, generate an ARQ PDU corresponding to an RLC data PDU set including at least one of the plurality of RLC data PDUs based on a resource allocation in the RLC entity, transmit, from the MAC layer, a first MAC PDU generated based on the RLC data PDU set and the ARQ PDU to a BS through a lower layer, and receive a status PDU associated with the RLC data PDU set when a certain condition is met.

Furthermore, the processor 1830 may receive an ARQ PDU and a first MAC PDU including a plurality of RLC data PDUs corresponding to the ARQ PDU in the MAC, update a state variable for an RLC data PDU set corresponding to the plurality of RLC data PDUs based on the ARQ PDU in an RLC entity, and transmit, to the BS, a status PDU generated based on receiving condition information indicating a receiving condition for at least one RLC data PDU set in a receiving window and the updated state variable, when a certain condition is satisfied.

The UE may operate as a transmitting device or a receiving device, as described above. Specifically, when the UE is the transmitting device, the BS operates as the receiving device, and it is obvious that when the UE is the receiving device, the BS may operate as the transmitting device.

Furthermore, the processor 1830 may be provided in the plural, and may execute the program stored in the memory 1820 to generate an ARQ PDU and perform operations for ARQ related operation, a packet discarding related operation, or segmentation handling based on the ARQ PDU according to embodiments of the disclosure.

Figure 19:
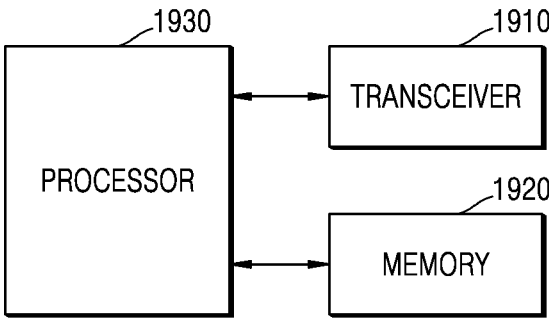
FIG. 19 illustrates a structure of a base station, according to an embodiment of the disclosure.

FIG. 19 is a block diagram of a BS, according to an embodiment of the disclosure.

Referring to FIG. 19, a BS may include a transceiver 1910, a memory 1920, and a processor 1930. Components of the BS are not, however, limited thereto. For example, the BS may include more or fewer elements than described above. In addition, the transceiver 1910, the memory 1920, and the processor 1930 may be implemented in a single chip.

In an embodiment of the disclosure, the transceiver 1910 may transmit or receive signals to or from a UE. The aforementioned signals may include control information and data. For this, the transceiver 1910 may include an RF transmitter for up-converting the frequency of a signal to be transmitted and amplifying the signal and an RF receiver for low-noise amplifying a received signal and down-converting the frequency of the received signal. In addition, the transceiver 1910 may receive a signal on a wireless channel and output the signal to the processor 1930, and transmit a signal output from the processor 1930 on a wireless channel.

In an embodiment of the disclosure, the memory 1920 may store a program and data required for operation of the BS. Furthermore, the memory 1920 may store control information or data included in a signal transmitted or received by the BS. The memory 1920 may include a storage medium such as a ROM, a RAM, a hard disk, a CD-ROM, and a DVD, or a combination of storage mediums. Moreover, the memory 1920 may be in the plural.

In an embodiment of the disclosure, the processor 1930 may control a series of processes for the BS to be operated according to the above embodiments of the disclosure. For example, the processor 1930 may generate an ARQ PDU and perform operations for ARQ related operation, a packet discarding related operation, or segmentation handling based on the ARQ PDU according to embodiments of the disclosure.

Furthermore, the processor 1930 may be provided in the plural, and may execute the program stored in the memory 1920 to perform a method of controlling monitoring of a DL control channel of the UE, and a method of configuring, generating and transmitting a power saving signal according to embodiments of the disclosure.

Methods according to the claims of the disclosure or the embodiments described in the specification may be implemented in hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs may include instructions that cause the electronic device to perform the methods in accordance with the claims of the disclosure or the embodiments described in the specification.

The programs (software modules, software) may be stored in a RAM, a non-volatile memory including a flash memory, a ROM, an electrically erasable programmable ROM (EEPROM), a magnetic disc storage device, a CD-ROM, a DVD or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus for performing the embodiments of the disclosure through an external port. Furthermore, an extra storage device in the communication network may access a device that performs the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure, which have been provided only for illustrative purposes. Furthermore, the embodiments may be operated by being combined with one another if necessary. For example, an embodiment of the disclosure and some of another embodiment of the disclosure may be combined to operate the BS and the UE. The embodiments of the disclosure may be equally applied to other communication systems, and other modifications of the embodiments may also be made without departing from the scope of the disclosure. For example, the embodiments may also be applied to an LTE system, 5G or NR system, 6G, etc.

The invention claimed is:

1. A method of operating a transmitting device in a wireless communication system, the method comprising:
   obtaining a plurality of radio link control (RLC) data protocol data units (PDUs) in an RLC entity;
   generating an automatic repeat request (ARQ) PDU corresponding to an RLC data PDU set including at least one of the plurality of RLC data PDUs based on a resource allocation in the RLC entity;
   transmitting, from a medium access control (MAC) layer, a first MAC PDU generated based on the RLC data PDU set and the ARQ PDU to a receiving device through a lower layer; and
   receiving a status PDU associated with the RLC data PDU set when a certain condition is satisfied,
   wherein the ARQ PDU comprises information for processing an operation related to the RLC data PDU set.

2. The method of claim 1, further comprising:
   generating a second MAC PDU including at least a portion of the RLC data PDU set based on a resource allocation for retransmission when the status PDU includes negative acknowledgment (NACK); and transmitting the second MAC PDU to the receiving device through a lower layer.

3. The method of claim 2, wherein the at least a portion of the RLC data PDU set included in the second MAC PDU is a segment obtained by segmenting the RLC data PDU set, wherein the method further comprises: updating the ARQ PDU based on the segmented RLC data set, wherein the second MAC PDU comprises the segmented RLC data PDU set and the updated ARQ PDU.

4. The method of claim 3, wherein the segmenting is performed on a byte basis or an RLC service data unit (SDU) basis, and wherein the updated ARQ PDU comprises information about the segmented RLC data PDU set.

5. The method of claim 4, wherein the information about the segmented RLC data PDU set comprises at least one of information about whether segmentation is made, information about a unit of segmentation, information about a location of segmentation, a starting point of segmentation, an ending point of segmentation, or information about an offset from the starting point of segmentation.

6. A method of operating a receiving device in a wireless communication system, the method comprising:

receiving an automatic repeat request (ARQ) protocol data unit (PDU) and a first medium access control (MAC) PDU including a plurality of radio link control (RLC) data PDUs corresponding to the ARQ PDU in an MAC layer;

updating a state variable for an RLC data PDU set corresponding to the plurality of RLC data PDUs based on the ARQ PDU in an RLC entity; and transmitting, to a transmitting device, a status PDU generated based on receiving condition information indicating a receiving condition for at least one RLC data PDU set in a receiving window and the updated state variable, when a certain condition is satisfied, wherein the ARQ PDU comprises information for processing an operation related to the RLC data PDU set.

7. The method of claim 6, further comprising:

determining whether the plurality of RLC data PDUs are included in a receiving window based on information included in the ARQ PDU; and discarding, based on a result of the determining, an RLC data PDU not included in the receiving window among the plurality of RLC data PDUs, wherein the information included in the ARQ PDU comprises a sequence number of each of the plurality of RLC data PDUs or an identification number of the RLC data PDU set.

8. The method of claim 6, further comprising:

determining, based on the information included in the ARQ PDU, whether the plurality of RLC data PDUs are redundantly received; and discarding an RLC data PDU determined as having been redundantly received among the plurality of RLC data PDUs, wherein the information included in the ARQ PDU comprises a sequence number of each of the plurality of RLC data PDUs or an identification number of the RLC data PDU set.

9. The method of claim 6, wherein the status PDU comprises negative acknowledgment (NACK) when it is determined that the RLC data PDU set is not received, and wherein the method further comprises: receiving, from the transmitting device, a second MAC PDU generated based on the status PDU.

10. The method of claim 9, wherein the second MAC PDU is generated based on at least a portion of the RLC data PDU set being segmented when a resource allocation for retransmission is smaller than a transmission resource required for the RLC data PDU set.

11. The method of claim 10, wherein the ARQ PDU included in the second MAC PDU comprises information about the segmentation, and the information about the segmentation comprises at least one of information about whether segmentation is made, information about a unit of segmentation, information about a location of segmentation, a starting point of segmentation, an ending point of segmentation, or information about an offset from the starting point of segmentation.

12. A transmitting device in a wireless communication system, the transmitting device comprising:

a transceiver; and at least one processor connected to the transceiver, wherein the at least one processor is configured to obtain a plurality of radio link control (RLC) data protocol data units (PDUs) in an RLC entity, generate an automatic repeat request (ARQ) PDU corresponding to an RLC data PDU set including at least one of the plurality of RLC data PDUs based on a resource allocation in the RLC entity, transmit a first medium access control (MAC) PDU generated based on the RLC data PDU set and the ARQ PDU in a MAC layer to a receiving device through a lower layer, receive a status PDU associated with the RLC data PDU set when a certain condition is satisfied, wherein the ARQ PDU comprises information for processing an operation related to the RLC data PDU set.

13. The transmitting device of claim 12, wherein the at least one processor is configured to generate a second MAC PDU including at least a portion of the RLC data PDU set based on a resource allocation for retransmission when the status PDU includes negative acknowledgment (NACK), and transmit the second MAC PDU to the receiving device through a lower layer.

14. The transmitting device of claim 13, wherein the at least a portion of the RLC data PDU set included in the second MAC PDU is a segment obtained by segmenting the RLC data PDU set, wherein the at least one processor is configured to update the ARQ PDU based on the segmented RLC data set, and wherein the second MAC PDU comprises the segmented RLC data PDU set and the updated ARQ PDU.

15. A receiving device in a wireless communication system, the receiving device comprising:

a transceiver; and at least one processor connected to the transceiver, wherein the at least one processor is configured to receive an automatic repeat request (ARQ) protocol data unit (PDU) and a first medium access control (MAC) PDU including a plurality of radio link control (RLC) data PDUs corresponding to the ARQ PDU in an MAC layer, update a state variable for an RLC data PDU set corresponding to the plurality of RLC data PDUs based on the ARQ PDU in an RLC entity, transmit, to a transmitting device, a status PDU generated based on receiving condition information indicating a receiving condition for at least one RLC data PDU set in a receiving window and the updated state variable, when a certain condition is satisfied, wherein the ARQ PDU comprises information for processing an operation related to the RLC data PDU set.

\* \* \* \* \*